(12) United States Patent
McLane et al.

(10) Patent No.: US 10,245,535 B2
(45) Date of Patent: Apr. 2, 2019

(54) FLUID FILTER APPARATUS

(71) Applicants: Jeffrey G. McLane, Mount Pleasant, SC (US); Michael G. Abruzzo, Sr., Roxboro, NC (US)

(72) Inventors: Jeffrey G. McLane, Mount Pleasant, SC (US); Michael G. Abruzzo, Sr., Roxboro, NC (US)

( * ) Notice: Subject to any disclaimer, the term of this patent is extended or adjusted under 35 U.S.C. 154(b) by 664 days.

(21) Appl. No.: 14/931,846

(22) Filed: Nov. 3, 2015

(65) Prior Publication Data

US 2017/0120169 A1    May 4, 2017

(51) Int. Cl.
| | |
|---|---|
| B01D 29/58 | (2006.01) |
| B01D 35/06 | (2006.01) |
| B01D 29/11 | (2006.01) |
| B01D 29/90 | (2006.01) |
| B01D 36/04 | (2006.01) |

(52) U.S. Cl.
CPC ............ B01D 35/06 (2013.01); B01D 29/114 (2013.01); B01D 29/58 (2013.01); B01D 29/906 (2013.01); B01D 36/045 (2013.01)

(58) Field of Classification Search
None
See application file for complete search history.

(56) References Cited

U.S. PATENT DOCUMENTS

| | | | | |
|---|---|---|---|---|
| 1,107,485 | A * | 8/1914 | Bowser ................ | B01D 21/26 210/304 |
| 1,471,807 | A * | 10/1923 | Roosevelt ............ | B01D 29/114 210/304 |
| 2,997,053 | A * | 8/1961 | Walker ............... | B01D 19/0063 137/173 |
| 3,448,858 | A * | 6/1969 | Mills .................. | B01D 21/0012 210/354 |
| 4,298,465 | A * | 11/1981 | Druffel .............. | B01D 17/0211 210/304 |
| 4,550,896 | A * | 11/1985 | Hansen, III ............ | B01D 35/04 137/377 |
| 2008/0017568 | A1* | 1/2008 | Robert ...................... | B04C 5/13 210/413 |

(Continued)

FOREIGN PATENT DOCUMENTS

JP    4297198 B2 *    7/2009    ........... B01D 29/114

*Primary Examiner* — Krishnan S Menon
*Assistant Examiner* — Brad Gordon
(74) *Attorney, Agent, or Firm* — Roger A. Jackson

(57) ABSTRACT

A fluid filter apparatus includes a first surrounding sidewall, a co-axial second surrounding sidewall, a co-axial third surrounding sidewall, and a co-axial fourth surrounding sidewall, an outer annulus as between the first and third surrounding sidewalls, and a domed end on the fourth sidewall, wherein a first interior is formed between the second and the fourth sidewalls. Also, a ported head body that includes two pairs of opposing inlet and outlet apertures and inlet and outlet chambers, wherein the body is adjacent to the first and third sidewalls and a filter media disposed within the first sidewall. Operationally, a dirty fluid enters therethrough the inlet aperture to the inlet chamber into the outer annulus, to the first interior, and through the dome and communicates onward therethrough the filter media and outward to the outlet chamber and to the outlet aperture.

16 Claims, 18 Drawing Sheets

(56) References Cited

U.S. PATENT DOCUMENTS

2008/0083668 A1\* 4/2008 Caiozza ................ B01D 27/08
 210/223
2012/0241369 A1\* 9/2012 McLane ................ B01D 29/07
 210/301

\* cited by examiner

FLUID FILTER APPARATUS

TECHNICAL FIELD

The present invention generally relates to an apparatus for filtering a fluid that flows through the filter apparatus. More particularly, the present invention is a fluid filter apparatus that has a substantially long life as between cleanings due to a combined effect of multi-stage filtration, magnets, and centrifugal separation.

BACKGROUND OF INVENTION

A basic conventional fluid filter operates by separating the solid contaminants from the fluid by utilizing a porous barrier that allows the fluid to pass and thereby contains the solid contaminants thus separating the particulate contaminants from the fluid. The most common barrier is a screen or mesh constructed of various materials that are compatible with the fluid characteristics such as fluid pressure, fluid temperature, and fluid corrosion issues. The typical fluid filter barrier has substantially symmetric openings that are sized such that they allow contaminants through that are sized smaller than the openings and that the barrier retains contaminants that are sized larger than the openings. Almost all of the typical particulate contaminants are approximately spherical in shape and if the overall size of the contaminants is larger than the barrier openings, the individual contaminant will partially wedge itself into the barrier opening from the force of the fluid flow through the barrier, if the individual contaminant is slightly larger than the barrier, however, if the individual contaminant is markedly larger than the barrier then the individual contaminant will most likely not wedge itself into the barrier. Thus, there are multiple points of contact between the barrier opening and the contaminant thus allowing the contaminant to become wedged into the opening, resulting in shorter filter lives as the more barrier openings that are substantially blocked by the contaminants result in the filter reducing its overall fluid flow rate ability for shortening the effective life of the filter as the filter loads up with contaminants.

If, for example a back flush operation is initiated, in other words reversing the fluid flow direction through the barrier in an effort to dislodge the contaminant that is wedged in the opening, the contaminant may not easily be dislodged due to the multiple points of contact with the opening with this being coupled with the usual semi resilient nature of the barrier (that is typically constructed of paper, or a polymer, wire mesh, and the like) and the contaminant (that can be fluid soaked, or resilient itself in a non symmetrical manner), resulting in retention of the individual contaminant in the barrier opening even during a back flush operation. In addition, the fluid flow force to dislodge the contaminant from the barrier is limited by the differential pressure capability of the barrier and the mechanical strength of the filtering material.

This drawback of the individual contaminant wedging into the barrier opening has been recognized in the prior art with one solution being to reshape the openings from substantially symmetric to a non symmetric shape that is typically a long thin rectangular opening that results in the individual contaminant having only two points of contact with the barrier opening which typically results in the individual contaminant being less "wedged" into the barrier, allowing in more effective removal of the individual contaminant from the barrier by the above described back flushing procedure as previously described, wherein this is typically termed a "self-cleaning" fluid filter. Also, as an enhancement and at times a necessity structurally, the long thin rectangular opening in the self-cleaning fluid filter barrier is constructed of a substantially rigid material (as compared to the conventional filter barrier being constructed of a typically resilient material as previously discussed) to accommodate the long span of the long thin rectangular opening which is a positive for further facilitating the dislodging of the contaminant from the barrier during the back flushing operation. Typically, self-cleaning fluid filters have two different modes of operation, the first mode is to have three continuously operating filter fluid ports that include a dirty fluid inlet port, a clean fluid outlet port, and a dirty fluid outlet port, under this mode of operation the self-cleaning fluid filter is continuously cleaned (with no back flushing required) and has an uninterrupted fluid filtering operation by essentially having a continuous flow of dirty fluid, wherein a continuous clean fluid flow is "bleed off" through the self-cleaning filter, as this mode being the ideal for continuous self-cleaning fluid filter operation being substantially maintenance free. When a fluid flow system cannot tolerate the continuous dirty fluid flow outlet (as in the case of for example, a fuel filter system or an oil filter lubrication system in an engine), in other words the fluid system requires a filter that has a single dirty fluid inlet and a single clean fluid outlet, (i.e. being a closed loop system as is typically required on a vehicle, boat, or any other mobile equipment) this is where a self-cleaning filter would require an intermittent back flushing operation which is the second mode of a self-cleaning filter operation. The second mode is to have two intermittently operating filter fluid ports that include the dirty fluid inlet port and the clean fluid outlet port, wherein an intermittent back flushing operation is required to remove an accumulation of trapped fluid contaminants from the filter by reversing the fluid flow such that the clean fluid outlet becomes the clean fluid inlet and the dirty fluid inlet becomes the dirty fluid outlet, with the back flush operation continuing until substantially all of the contaminants are removed from the filter.

Another type of self-cleaning "filter" is called a centrifugal separator, wherein the fluid is spun in a vortex and through the use of centrifugal force the heavier particulates are spun outward against a typically frustroconically shaped wall (usually with the narrow end downward) to settle out of the spinning fluid downwardly and the clean fluid floats out of the vortex centrally upwardly with the larger heavier particles removed. The centrifugal separator works fluid flow wise much like the previously described first mode of operation for the self-cleaning filter, wherein there is no backflushing required i.e. there is a dirty fluid inlet (typically tangentially located adjacent to the frustroconical wall), a dirty fluid outlet (typically located at the bottom of the narrowed frustroconical wall), and a clean fluid outlet (typically located at the top central portion of the frustroconical chamber), wherein proper operation of the centrifugal separator is maintained by proper pressure differences and flowrates maintained between the dirty fluid inlet, the dirty fluid outlet, and the clean fluid outlet. Thus, the centrifugal separator is a continuously operating and non maintenance device, which makes it seem attractive, however, it is not really a filter and is really more of a classifier to separate heavy particulates from the lighter fluid, thus the "filtration" is by no means absolute, i.e. light particulates would not be separated out and some heavy particulates could be included in the clean fluid outlet, thus for many applications a centrifugal separator would not be desirable. A further type of self-cleaning filter is a type for use with gases to remove particulate matter from a gas stream either on a conventional filter material, or including a dielectric material in the filter by polarizing the dielectric material across a pair of electrodes to electrically collect particulates from the gas stream. Then making the filter self-cleaning by vaporizing the collected particulates from either a conventional filter or dielectric filter using a higher electrical potential than is used to collect the particulates in the filtration process, thus the vaporized particulates are reduced in size to be acceptably passed through the filter. A yet further type of self-cleaning filter is to mechanically "scrape" the filter element of contaminate build up as part of a built in self-cleaning filter apparatus.

In looking at the prior art in this area, in U.S. Pat. No. 5,078,875 to Lösing disclosed is a separator for removing dirt and water from a liquid fuel that has a rectangular cross section central portion of its housing provided with a filter and a cup shaped lower portion of the housing having a guide tube through which the liquid is introduced downwardly around a vaned helical body generating a vortex flow of the liquid before it is diverted downwardly around the guide tube into the bowl chamber. The exterior in Lösing of the guide tube is formed with a pair of horizontal V-shaped feedback passages which draw droplets of the liquid of higher density downwardly to meet the flow from the interior of the guide tube before it is deflected upwardly to the final filter, thereby increasing the separation efficiency.

Further, in U.S. Pat. No. 4,298,465 to Druffel disclosed a self-contained apparatus for the separation of low density fluids, such as fuel, from higher density fluids such as water and also other particles is disclosed which may be easily retrofitted into a variety of existing new and used engines as it can selectively accommodate the various fuel line arrangements and also various obstructions of these engines. Further, the apparatus in Druffel includes improved flow director means which provides for the separation of the higher density fluid and the particles from the low density fluid at an earlier stage contributing to a more complete separation prior to the filtration of the fluid. Consequently, in Druffel the filter element has an extended life due to the fact that it is exposed to less higher density fluids and particles in filtering the low density fluids.

Continuing in the prior art in U.S. Pat. No. 4,312,751 to Casamitjana disclosed is a device for separating contaminants from a liquid with which such contaminants are not miscible. Casamitjana comprises an inlet and outlet portion formed with an inlet opening for allowing liquid to enter the device and an outlet opening for allowing liquid to leave the device, and a separator portion, the separator portion being releasably secured to the inlet and outlet portion and including a generally cylindrical receptacle. The cylindrical receptacle in Casamitjana which in use, is disposed with its central axis substantially vertical and with the inlet and outlet portion of the device at its upper end, and an impeller element at the upper end of the cylindrical receptacle and disposed to receive liquid entering the device by way of said inlet opening and to conduct such liquid into the receptacle while imparting a rotational component of movement thereto. Whereby the contaminants in Casamitjana are separated from the liquid by centrifugal effects and settle to the bottom of the receptacle while liquid having contaminants separated therefrom leaves the device by way of the outlet opening. Wherein the stilling vanes 9 in Casamitjana act to keep the particles and heavier fluids at the bottom of the bowl, also the inverted cone 10 helps to drive the particles and the heavier fluid toward the bottom of the bowl also.

Next, in the prior art in U.S. Pat. No. 4,456,529 to Shinaver disclosed is a filter apparatus for separating fluids of different densities. The apparatus has a relatively small housing size such that it is particularly suited for installation in passenger vehicles. The construction of the subject filter in Shinaver is intended to eliminate sealing problems found in the prior art as well as to permit the utilization of a filter having increased capacity by virtue of it being a cylindrical filter.

Further, in the prior art in U.S. Pat. No. 4,502,954 to Druffel, disclosed is a combination fuel filter and water separator which is particularly useful at the upstream, suction side of a fuel pump that includes a provision for initial settling of water and particulate material in a lower chamber, after which the fluid passes up through a backflow preventing check valve and into an upper chamber, where fine filtration takes place. In Druffel, the check valve, preferably a ball valve between the lower and upper chambers, prevents any backflow of fuel by gravity from the filter/separator assembly when a top cover is opened, e.g. for servicing of a filter element in the upper chamber. The location of the ball valve in Druffel avoids subjecting it to highly contaminated entering fuel, which could foul the valve. Associated with the inlet structure of Druffel the assembly is a channel for inducing a helical flow path for centrifugally removing water and particles while imparting a downward component of motion to them, noting that this is similar in construction to Shinaver.

Next, in the prior art in U.S. Pat. No. 6,355,178 to Couture, et al. disclosed is a cyclone or hydrocyclone for separating fluids and particles that includes an electrostatic charge generator, a direct current power source, a magnet or an electromagnet for augmenting the centrifugal separation forces generated by the cyclone or hydrocyclone, as shown in FIGS. 8, 16, and 17. In Couture, the cyclone or hydrocyclone also includes a physical vibration generator or a sonic wave generator or both, as shown in FIG. 17. The point in Couture is to increase the precipitation of fine particles out of the cyclone, wherein the cyclone uses centrifugal force to pull out particles, Couture adds; vibration, electrostatic charges, and electromagnets to further pull out particles from the fluid stream in the cyclone.

Continuing, in the prior art in U.S. Pat. No. 7,396,460 to Wnuk, et al. disclosed is a filter element, especially for use in backwash filtering systems that includes a filtering element through which a contaminated fluid flows in at least one direction. An intercepting device in Wnuk has at least one rod-shaped permanent magnet or electromagnet that at least partially removes magnetizable, especially ferritic portions from the fluid, before the fluid flows through the filtering element. A detaching device in Wnuk removes the magnetizable portions from the intercepting device and the detaching device is configured by a stripper ring that travels along the rod-shaped magnet and removes the portions retained by the intercepting device. When the filtering element in Wnuk is backwashed, the stripper ring, moved by the fluid flow, detaches the portions retained by the intercepting device. This filter element requires little construction space and allows for the automatic and energetically favorable removal of magnetizable, especially ferritic portions, when the filtering element is backwashed.

Further, in the prior art in U.S. Pat. No. 6,579,454 to Kaske disclosed is a magnetic separator for separating particles from a fluid, comprising a collection chamber through which the fluid is arranged to flow, and a device for producing a magnetic field by means of which the particles are retained in a collector region of the collection chamber during a collection phase. Whereby in Kaske, only a very small amount of liquid is lost when the particles retained in the collector region of the collection chamber are removed from the collection chamber after the collection phase, it is proposed that the magnetic separator comprise a sluice chamber having a closable inlet opening through which the particles collected in the collection chamber are transferable into the sluice chamber, and also having a closable extraction opening through which the particles are removable from the sluice chamber.

Yet further, in the prior art in U.S. Pat. No. 6,758,969 to Caiozza disclosed is a magnetically enhanced oil filter apparatus that includes a cartridge housing which has an oil input channel and an outlet channel. The cartridge housing in Caiozza defines a cartridge interior space and a magnet unit is affixed to an outside portion of the cartridge housing, whereby a magnetic field from the magnet unit extends into the cartridge interior space providing an interior magnetic field zone. A hollow annular (e.g. cylindrical) filter element in Caiozza is employed, wherein filter positioning means are provided for supporting and positioning the hollow cylindrical filter element. Oil flow control means in Caiozza are positioned so that portions thereof enter the interior magnetic field zone, for directing oil flow to and from the hollow cylindrical filter element. In this respect, in Caiozza the oil flow control means are positioned with respect to the hollow cylindrical filter element and the interior magnetic field zone to divide the interior magnetic field zone into a pre-filtration magnetic treatment zone and a post-filtration magnetic treatment zone.

Next, in the prior art in U.S. Pat. No. 6,210,572 to Tulchinsky disclosed is a filter for removal of magnetic particles in which a liquid flows through a first compartment containing magnetic balls tightly packed together so that there is no direct flow path but only around these magnetic balls. Increased mixing in Tulchinsky of flow coupled with strong intensity of a magnetic field across the flow promotes better attraction and retention of the magnetic particles on the magnetic balls. The second compartment in Tulchinsky contains commonly known porous materials of known porosity to remove smaller non-magnetic particles, wherein the filter is particularly useful as a fuel or oil filter for an internal combustion engine. In one embodiment in Tulchinsky, the magnetic portion is made removable and individually replaceable to extend the life of the filter. The filter is capable of removing magnetic particles for an extended period of time without clogging.

Self-cleaning or substantially self-cleaning filters are in general highly desirable due to lower maintenance required, reducing periodic or inadvertent shutdowns of a fluid process or system i.e. by almost having completely continuous use, and are "greener" environmentally in that there is reduced disposable waste generated from used or contaminated filter elements, of which can be an environmental problem if the filtered fluid is toxic, flammable, and the like. What is needed therefore is a substantially self-cleaning filter having an expanded micro filtering ability due to combining multiple filtering processes of centrifugal particulate separation, magnetic particle attraction, multiple stages of straining, and a final fine filtration to provide micro filtration with the longest filter assembly life before needing maintenance. This as opposed to the conventional single stage non self-cleaning filter wherein all of the filter fluid flow force tends to hold the contaminates trapped into the filter element, thus further entrapping and wedging the contaminates into the filter element wherein the buildup of these contaminates occurs at a faster rate necessitating more frequent filter maintenance.

It is desired that the present invention of a self-cleaning filter, have the ability to filter down to a very fine level of about 10 micron absolute or less, while being able to centrifugally remove heavier fluids and particles upstream of the final 10 micron absolute filter along with successive stages of finer particulate straining also removing particulates upstream of the final 10 micron absolute filter to maximize the intervals between filter maintenance in a closed loop system wherein a continuous dirty fluid outlet cannot be tolerated that a true self-cleaning filter requires.

SUMMARY OF INVENTION

Broadly, the present invention of a fluid filter apparatus for helping to purify a fluid includes a first surrounding sidewall with a first end portion and an opposing second end portion, also a second surrounding sidewall including a primary end portion and an opposing secondary end portion, wherein the second surrounding sidewall is substantially co-axially disposed within the first surrounding sidewall, with the secondary end portion adjacent to the first end portion. Further included on the fluid filter apparatus is a third surrounding sidewall including a third end portion and an opposing fourth end portion, wherein the third surrounding sidewall is co-incident to the first surrounding sidewall forming an outer annulus as between the first and third surrounding sidewalls, wherein the third end portion of the third surrounding sidewall is adjacent to the secondary end portion of the second surrounding sidewall.

Further, the fluid filter apparatus includes a fourth surrounding sidewall including a fifth end portion and an opposing sixth end portion, the second surrounding sidewall is co-incident with the fourth surrounding sidewall forming a first environmental interior as between the second and fourth surrounding sidewalls, wherein the fifth end portion of the fourth surrounding sidewall is adjacent to the third end portion of the third surrounding sidewall, wherein a fluid communication is between the outer annulus and the first environmental interior.

Also, the fluid filter apparatus includes a domed end that is adjacent to the sixth end portion of the fourth surrounding sidewall, the domed end forming a fourth environmental interior, wherein the fourth environmental interior is in fluid communication with the first environmental interior, in addition, a second environmental interior is defined as being disposed within the second surrounding sidewall, and a third environmental interior is defined as being disposed within the first surrounding sidewall.

Continuing, the fluid filter apparatus includes a ported head body that includes a pair of opposing inlet apertures, a pair of opposing outlet apertures, an inlet chamber in fluid communication with the pair of inlet apertures, an outlet chamber in fluid communication with the pair of outlet apertures, a standpipe in fluid communication with the outlet chamber, and a diversion plate that blocks fluid communication as between the inlet and outlet chambers. Wherein the ported head body second end portion of the first surrounding sidewall is adjacent to the port head body and the fourth end portion of the third surrounding sidewall is adjacent to the port head body such that a fluid communication exists as between the inlet chamber and the outer annulus, and a fluid communication exists as between the outlet chamber and the third environmental interior.

Further, for the fluid filter apparatus, included is a filter media disposed within the third environmental interior, wherein operationally a dirty fluid enters therethrough the inlet aperture to the inlet chamber into the outer annulus and communicates onward to the first environmental interior therethrough to the fourth environmental interior communicating onward to the second environmental interior, the fluid further communicating into the third environmental interior, and further the fluid communicates therethrough the filter media and onward to the outlet chamber to the outlet aperture.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
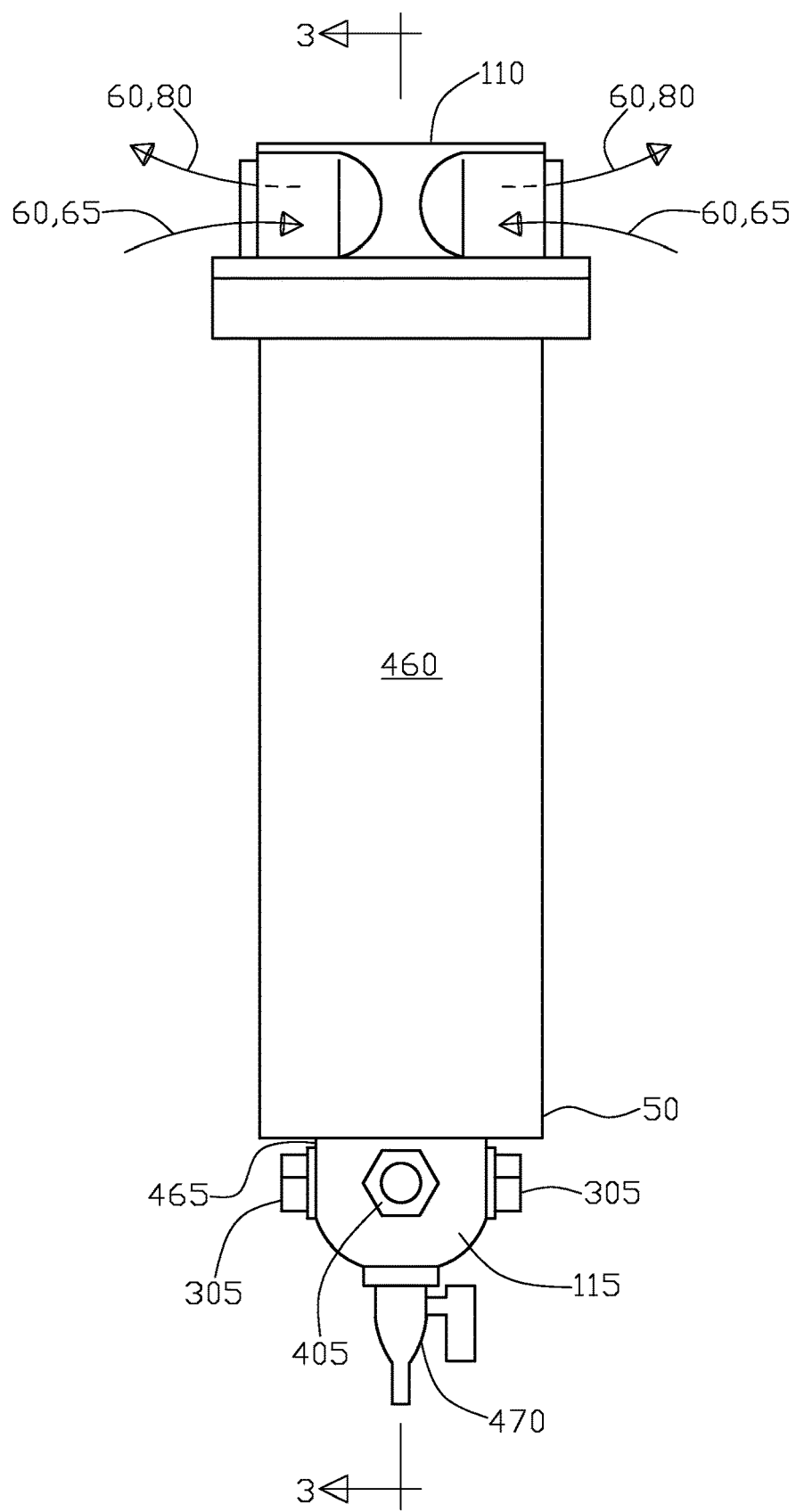
FIG. 1 shows a side elevation view of the fluid filter apparatus having inlet and outlet apertures, further shown is a ported head, a third surrounding sidewall, a fourth surrounding sidewall, a dome, a sight glass, magnetic drains, plus a drain valve.

50 Fluid filter apparatus
60 Fluid
65 Dirty fluid 60
70 Particulate contaminates (coarse)
71 Particulate contaminates (fine)
75 Heavier fluid 60
80 Substantially purified fluid 60
85 First surrounding sidewall
90 First end portion of the first surrounding sidewall 85
95 Second end portion of the first surrounding sidewall 85
100 Dirty fluid inlet aperture
105 Outlet aperture
110 Ported head body
115 Domed end
120 Second surrounding sidewall
125 Primary end portion of the second surrounding sidewall 120
130 Secondary end portion of the second surrounding sidewall 120
135 Co-axial disposing of the second 120 and first 85 surrounding sidewalls
140 First environmental interior
145 Second environmental interior
150 Third environmental interior
151 Fourth environmental interior
155 Primary strainer
160 Secondary strainer
165 Filter media
170 Vane
175 Continuous helical channel formed by the vane 170
180 Imparting a continuous centrifugal velocity to the dirty fluid 65 from the continuous helical channel 175 formed by the vane 170
185 Proximate to the primary strainer 155
190 Frustroconical shape of the primary strainer 155
195 Continuation of the primary end portion of the second surrounding sidewall 120
200 Lower centrifugal velocity of the dirty fluid 65 having fewer heavier fluids 75 and fewer particulate contaminates 70
205 Higher centrifugal velocity of the dirty fluid 65 having heavier fluids 75 and particulate contaminates 70 being driven towards the dome 115
210 Frustroconical shape of the secondary strainer 160
215 Structurally disposed within a majority of the second environmental interior 145 for the secondary strainer 160 frustroconical shape 210
220 Substantially parallel relationship as between the secondary strainer 160 frustroconical shape 210 and the second surrounding sidewall 120
225 Coalescing chamber for removing water in filter media 165 that is treated with silicone
230 Fluid flow cross sectional area of the coalescing chamber 225
235 Fluid flow cross sectional area of the second environmental interior 145
240 Reducing the fluid velocity to allow for further settling out of heavier fluids 75 and particulate contaminates 70, 71 prior to the fluid entering the filter media 165
305 Magnetic drain plug
310 Transfer valve for dual filter system
315 Auxiliary port
400 Permanent magnet insert
405 Sight glass for visual access of strainer 155 to show water coalesced in the fluid 60
410 Parallel arrangement of a plurality of filters 50
415 Series arrangement of a plurality of filters 50
420 Boost pump for super fine filtration being less than ten micron
425 This distance can vary depending on the axial length of the filter element 165
430 Stand pipe for filter element 165
435 Diversion plate
440 Spyder adaptor for support the filter element 165
445 Outer annulus
450 Inlet chamber of the ported head 110
455 Outlet chamber of the ported head 110
460 Third surrounding sidewall
461 Third end portion of the third surrounding sidewall 460
462 Fourth end portion of the third surrounding sidewall
465 Fourth surrounding sidewall
466 Fifth end portion of the fourth surrounding sidewall
467 Sixth end portion of the fourth surrounding sidewall
470 Drain valve
475 Single piece nipple fitting
480 External thread coupling

DETAILED DESCRIPTION

Broadly, with initial reference to FIG. 1 shown is a side elevation view of the fluid filter apparatus 50 having inlet 100 and outlet 105 apertures, further shown is a ported head 110, a third surrounding sidewall 460, a fourth surrounding sidewall 465, a dome 115, a sight glass 405, magnetic drains 305, plus a drain valve 470. Next, FIG. 2 shows a ninety degree rotated side elevation view of the fluid filter apparatus 50 from FIG. 1 again having inlet 100 and outlet 105 apertures, further shown is a ported head 110, a third surrounding sidewall 460, a fourth surrounding sidewall 465, a dome 115, a sight glass 405, magnetic drains 305, plus a drain valve 470.

Figure 3:
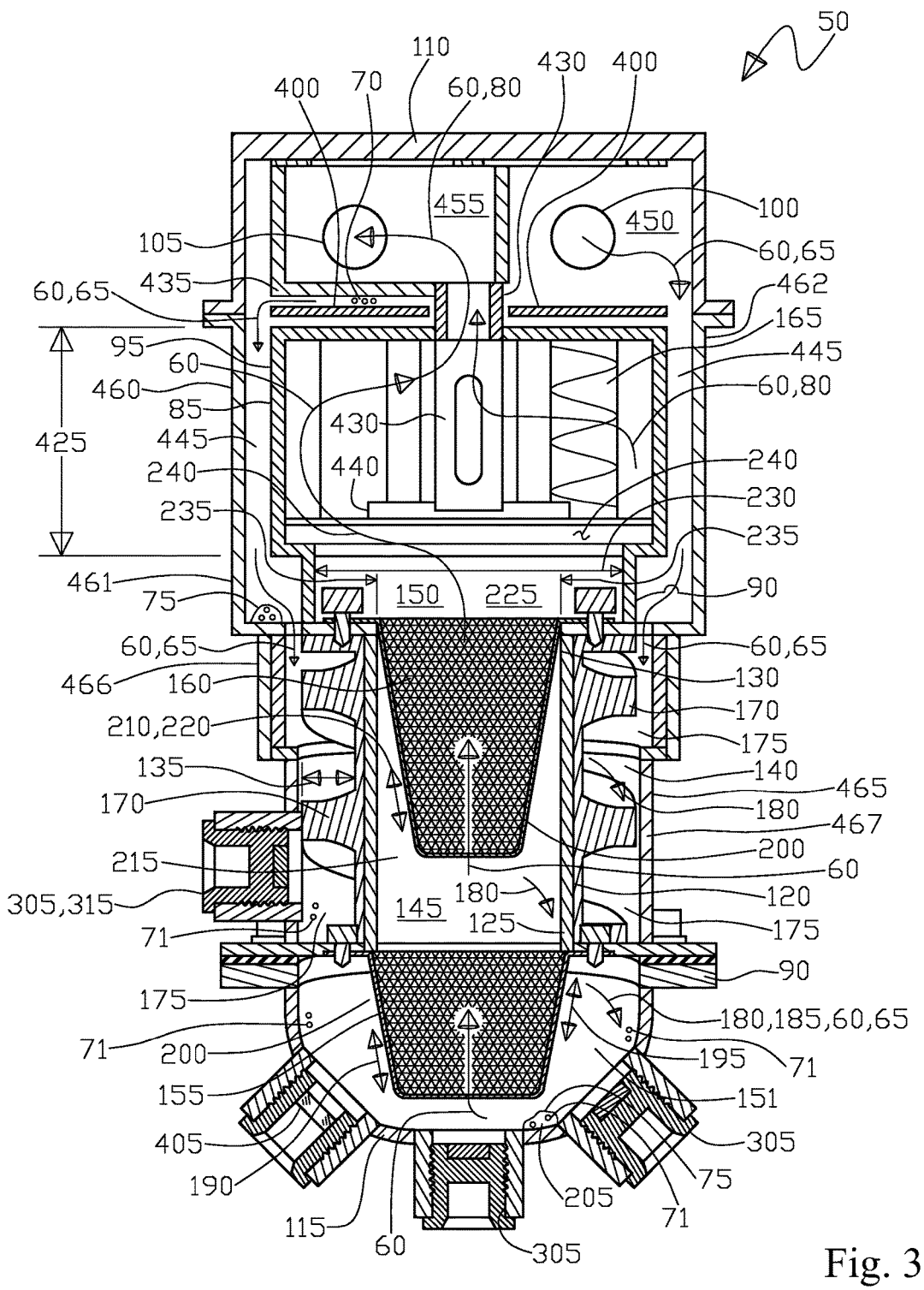
FIG. 3 shows cross section 3-3 from FIG. 1 to show the fluid filter apparatus internals that include showing the inlet and outlet apertures, further shown is the ported head, a first surrounding sidewall, a second surrounding sidewall, the third surrounding sidewall, the fourth surrounding sidewall, the dome, the sight glass, the magnetic drains, further shown are primary and secondary strainers, a vane, a continuous helical channel, a filter media, along with a first environmental interior, a second environmental interior, a permanent magnet insert that is exposed to the inlet dirty fluid flow, and a third environmental interior, plus a coalescing chamber.

Continuing, FIG. 3 shows cross section 3-3 from FIG. 1 to show the fluid filter apparatus 50 internals that include showing the inlet 100 and outlet 105 apertures, further shown is the ported head 110, a first surrounding sidewall 85, a second surrounding sidewall 120, the third surrounding sidewall 460, the fourth surrounding sidewall 465, the dome 115, the sight glass 405, the magnetic drains 305. Also FIG. 3 shows a primary 155 and a secondary 160 strainer, a vane 170, a continuous helical channel 175, a filter media 165, along with a first environmental interior 140, a second environmental interior 145, a permanent magnet insert 400 that is exposed to the inlet dirty fluid flow 60, 65, and a third environmental interior 150, plus a coalescing chamber 225.

Figure 2:
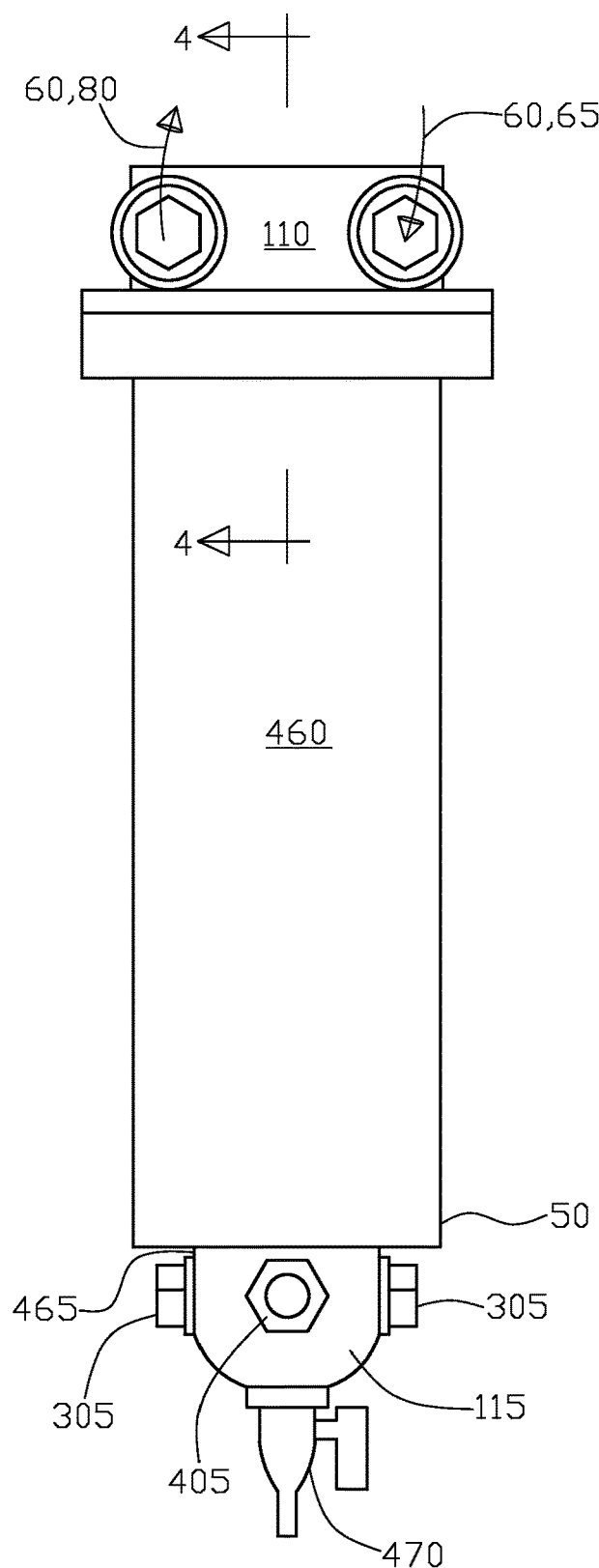
FIG. 2 shows a ninety degree rotated side elevation view of the fluid filter apparatus from FIG. 1 again having inlet and outlet apertures, further shown is a ported head, a third surrounding sidewall, a fourth surrounding sidewall, a dome, a sight glass, magnetic drains, plus a drain valve.
Figure 4:
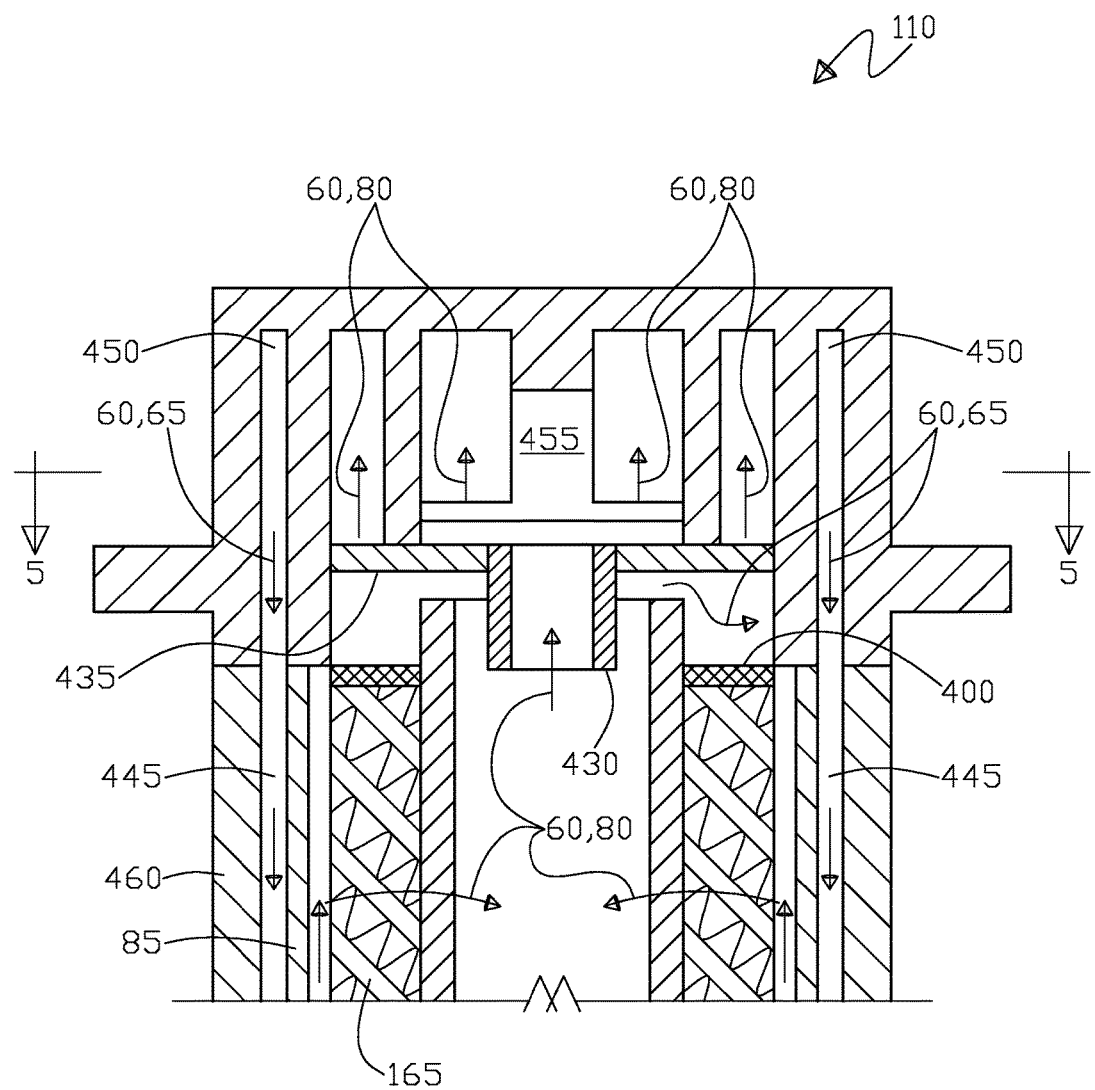
FIG. 4 shows cross section 4-4 of FIGS. 2 and 5 of the ported head that includes inlet dirty fluid flow and outlet substantially purified fluid flows, an inlet chamber, an outlet chamber, the filter media, an outer annulus disposed between the first and the third surrounding sidewalls, a filter standpipe, the permanent magnet insert that is exposed to the inlet dirty fluid flow, and a diversion plate.
Figure 5:
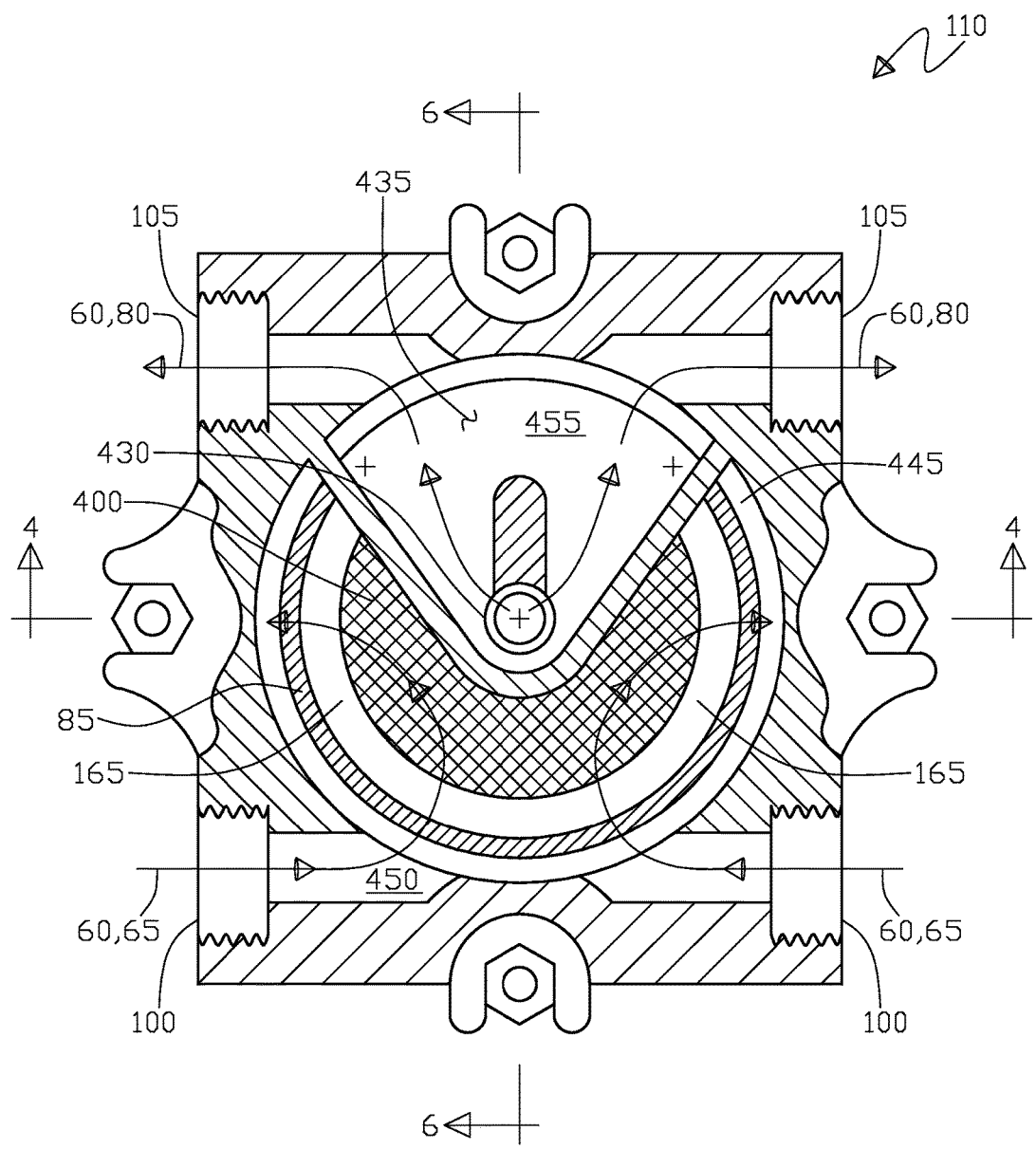
FIG. 5 shows cross section 5-5 of FIG. 4 of the ported head that includes the inlet and outlet apertures, the inlet dirty fluid flow and the outlet substantially purified fluid flow, the inlet chamber, the outlet chamber, the filter media, the outer annulus, the first surrounding sidewall, a filter standpipe, the permanent magnet insert that is exposed to the inlet dirty fluid flow, and a diversion plate.

Further, FIG. 4 shows cross section 4-4 of FIGS. 2 and 5 of the ported head 110 that includes inlet dirty fluid flow 60, 65 and outlet substantially purified fluid flows 60, 80, an inlet chamber 450, an outlet chamber 455, the filter media 165, an outer annulus 445 disposed between the first 85 and the third 460 surrounding sidewalls, a filter standpipe 430, the permanent magnet insert 400 that is exposed to the inlet dirty fluid flow 60, 65, and a diversion plate 435. Continuing, FIG. 5 shows cross section 5-5 of FIG. 4 of the ported head 110 that includes the inlet 100 and outlet 105 apertures, the inlet dirty fluid flow 60, 65 and the outlet substantially purified fluid flow 60, 80, the inlet chamber 450, the outlet chamber 455, the filter media 165, the outer annulus 445, the first surrounding sidewall 85, a filter standpipe 430, the permanent magnet insert 400 that is exposed to the inlet dirty fluid flow 60, 65, and the diversion plate 435.

Figure 6:
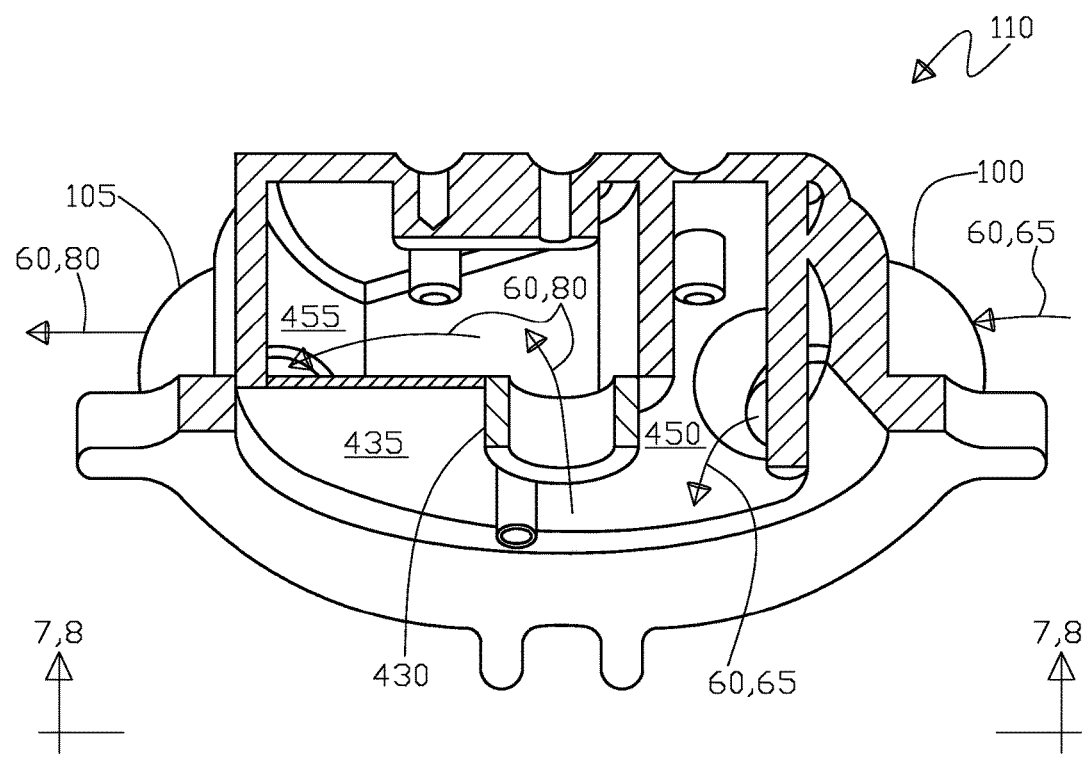
FIG. 6 shows cross section 6-6 of FIG. 5 of the ported head that includes the inlet and outlet apertures, the inlet dirty fluid flow and the outlet substantially purified fluid flow, the inlet chamber, the outlet chamber, the filter standpipe, and the diversion plate.
Figure 7:
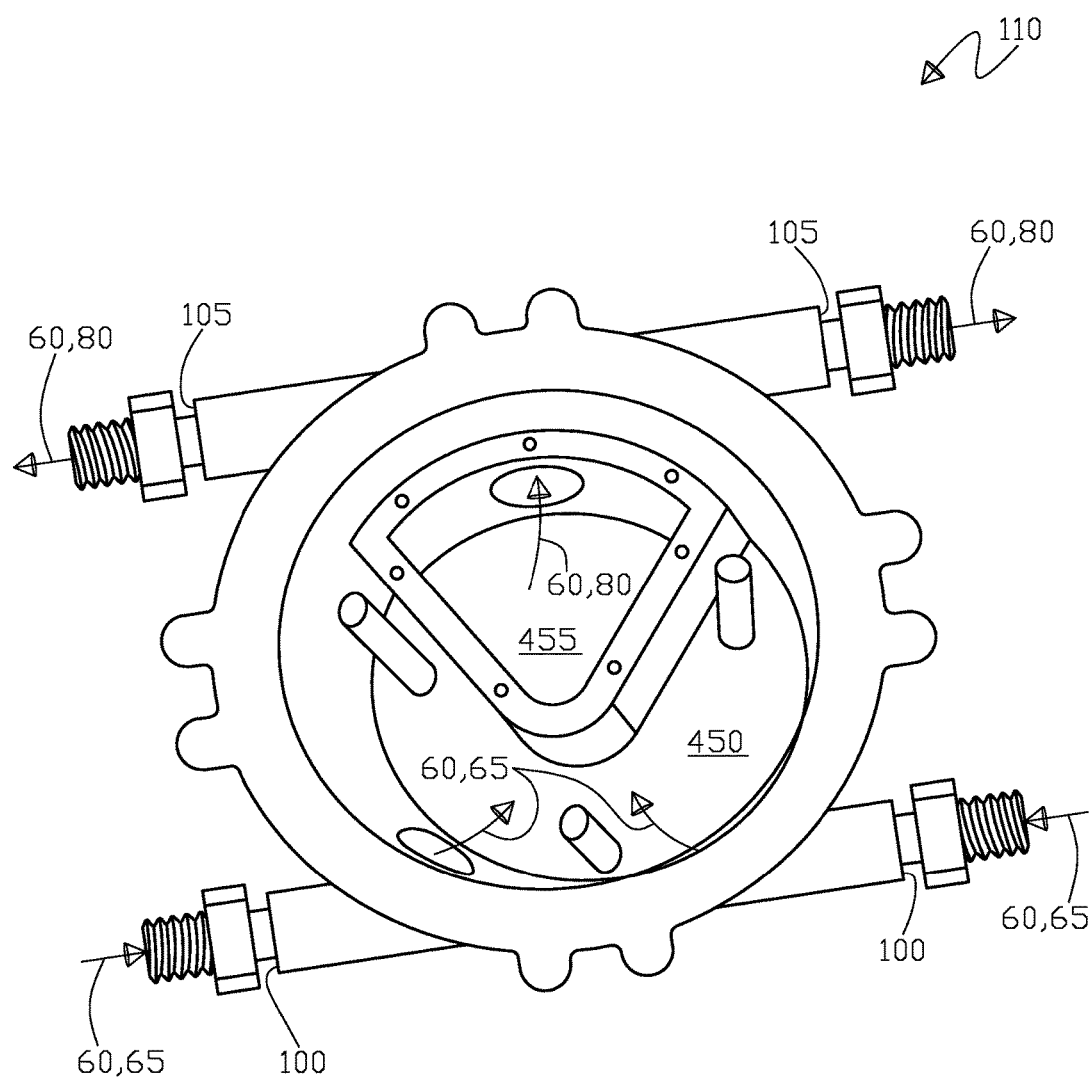
FIG. 7 shows view 7-7 of FIG. 6 of the ported head that includes the inlet and outlet apertures, the inlet dirty fluid flow and the outlet substantially purified fluid flow, the inlet chamber, the outlet chamber, with the filter standpipe and the diversion plate both removed for pictorial clarity.
Figure 8:
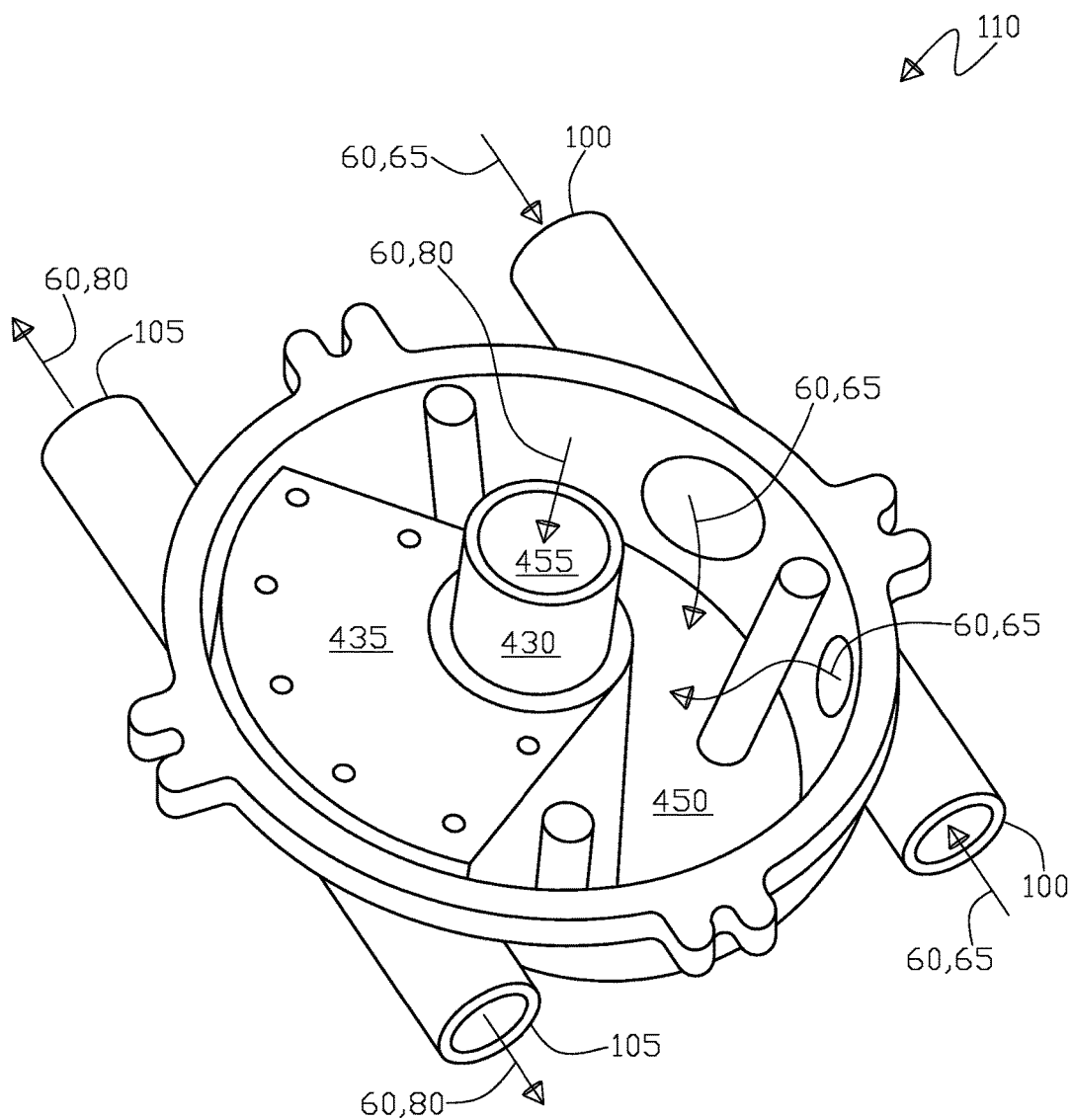
FIG. 8 shows view 8-8 of FIG. 6 of the ported head that includes the inlet and outlet apertures, the inlet dirty fluid flow and the outlet substantially purified fluid flow, the inlet chamber, the outlet chamber, the filter standpipe, and the diversion plate.

Next, FIG. 6 shows cross section 6-6 of FIG. 5 of the ported head 110 that includes the inlet 100 and outlet 105 apertures, the inlet dirty fluid flow 60, 65 and the outlet substantially purified fluid flow 60, 80, the inlet chamber 450, the outlet chamber 455, the filter standpipe 430, and the diversion plate 435. Further, FIG. 7 shows view 7-7 of FIG. 6 of the ported head 110 that includes the inlet 100 and outlet 105 apertures, the inlet dirty fluid flow 60, 65 and the outlet substantially purified fluid flow 60, 80, the inlet chamber 450, the outlet chamber 5, with the filter standpipe 430 the diversion plate 435 both removed for pictorial clarity. Continuing, FIG. 8 shows view 8-8 of FIG. 6 of the ported head 110 that includes the inlet 100 and outlet 105 apertures, the inlet dirty fluid flow 60, 65 and the outlet substantially purified fluid flow 60, 80, the inlet chamber 450, the outlet chamber 455, the filter standpipe 430, and the diversion plate 435.

Figure 9:
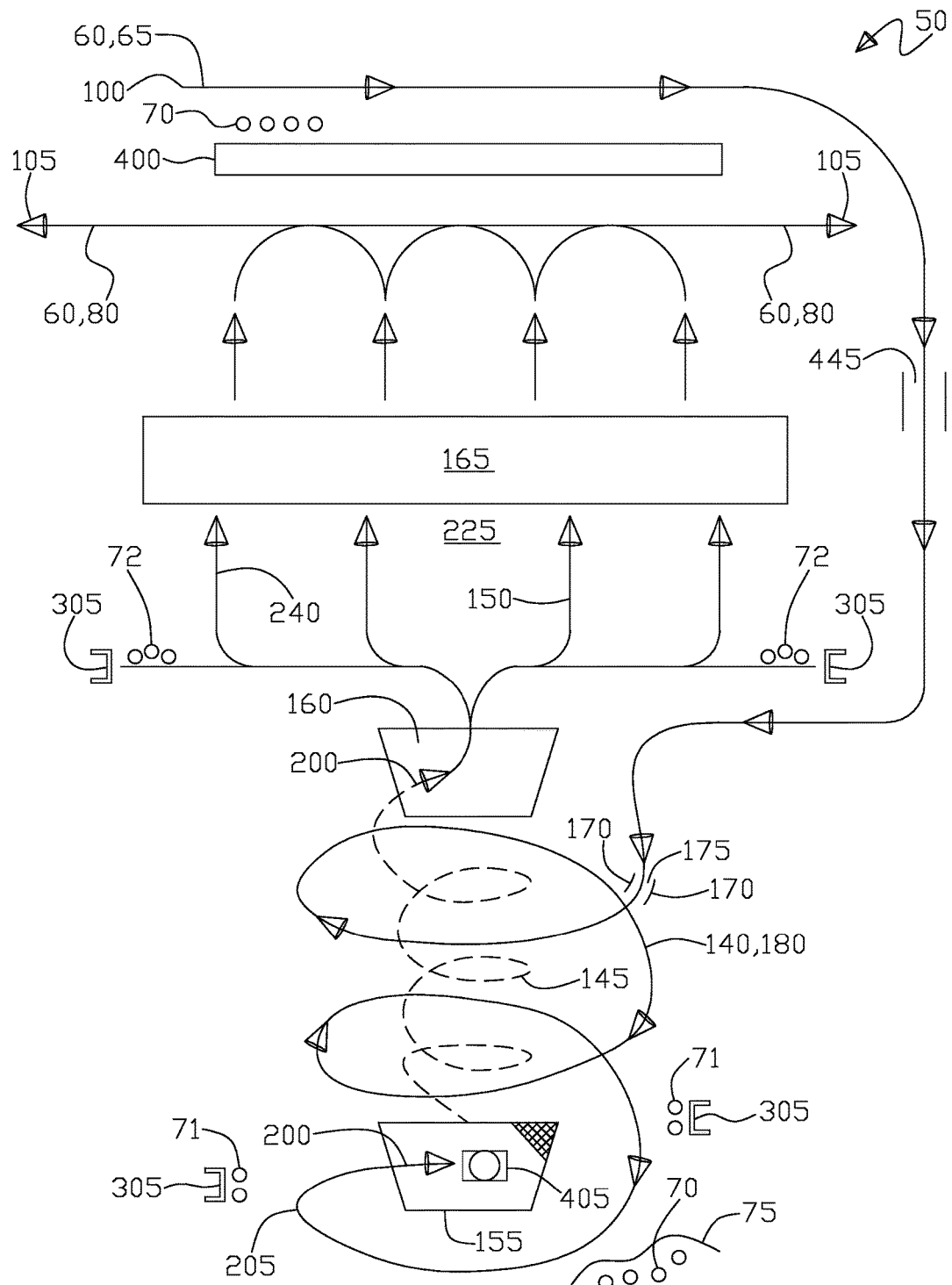
FIG. 9 shows a schematic diagram of primarily fluid flow through the fluid filter apparatus in proceeding from the dirty fluid inlet to flowing across the permanent magnet to pick up particulates, then through the outer annulus to imparting a continuous centrifugal velocity to the dirty fluid from the continuous helical channel vane in the first environmental interior and then proceeding to the primary strainer which is adjacent to the lower centrifugal velocity fluid, adjacent to the sight glass, then through the primary strainer and while the fluid still has a degree of centrifugal velocity in the second environmental interior proceeding to the secondary strainer which is adjacent to the lower centrifugal velocity fluid, then through the secondary strainer into the third environmental interior and into the coalescing chamber wherein the fluid velocity is slowed down prior to entering the filter media, wherein the substantially purified fluid exits the filter media and proceeds onto the outlet aperture.

Moving ahead, FIG. 9 shows a schematic diagram of primarily fluid 60 flow through the fluid filter apparatus 50 in proceeding from the dirty fluid inlet 100 to flowing across the permanent magnet 400 to pick up particulates 70, then through the outer annulus 445 to imparting a continuous centrifugal velocity 180 to the dirty fluid 60, 65 from the continuous helical channel 175 vane 170 in the first environmental interior 140 and then proceeding to the primary strainer 155 which is adjacent to the lower centrifugal velocity fluid 200, adjacent to the sight glass 405. In addition, FIG. 9 shows the fluid 60 proceeding through the primary strainer 155 and while the fluid 60 still has a degree of centrifugal velocity in the second environmental interior 145 proceeding to the secondary strainer 160 which is adjacent to the lower centrifugal velocity fluid 200, then through the secondary strainer 160 into the third environmental interior 150 and into the coalescing chamber 225 wherein the fluid 60 velocity is slowed down prior to entering the filter media 165, wherein the substantially purified fluid 60, 80 exits the filter media 165 and proceeds onto the outlet aperture 105.

Figure 10:
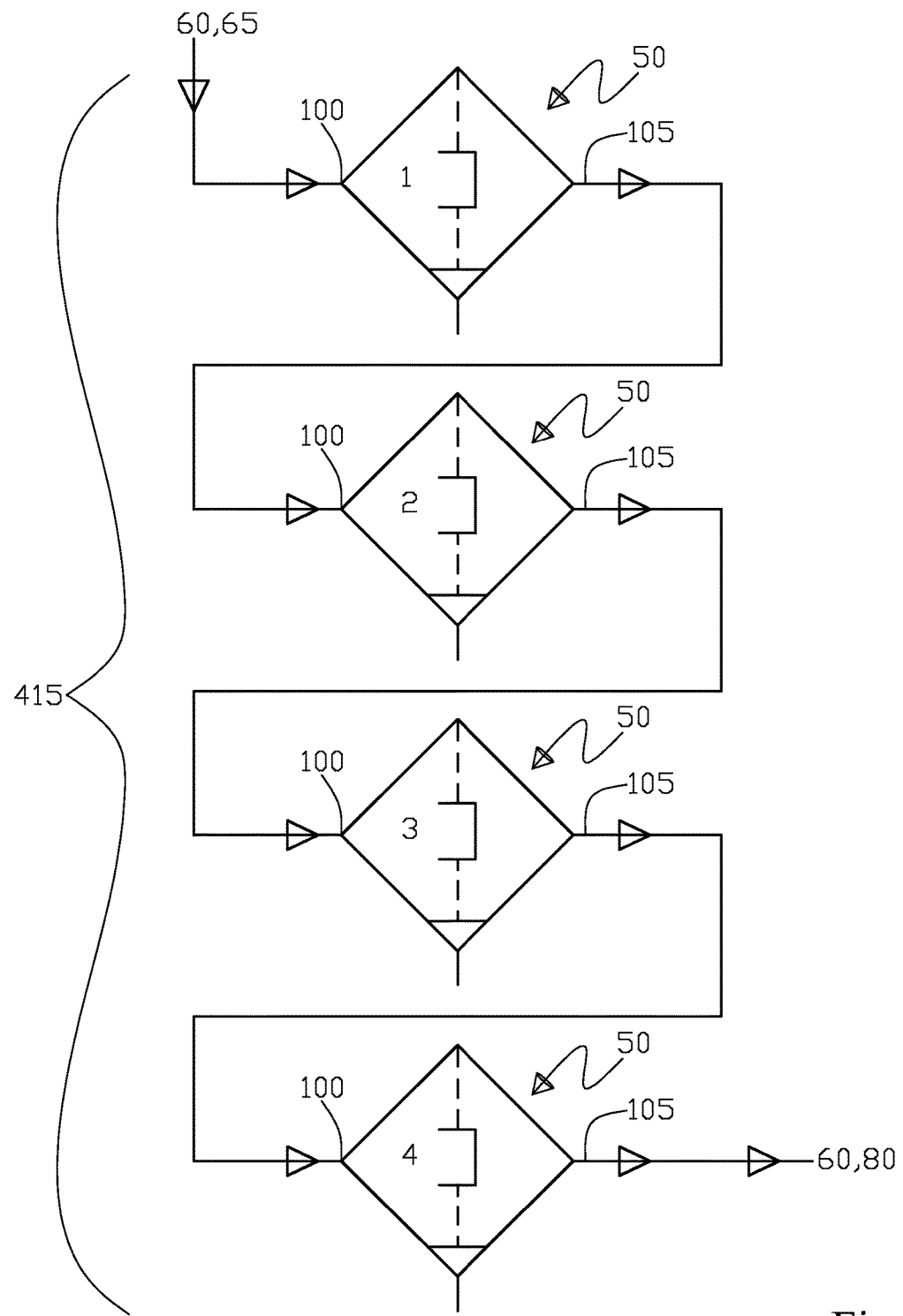
FIG. 10 shows a fluid schematic of a plurality of fluid filter apparatus having strainers and magnets that are arranged is a series configuration where each fluid filter includes the inlet and outlet apertures, plus the overall inlet dirty fluid flow and the outlet substantially purified fluid flow.
Figure 11:
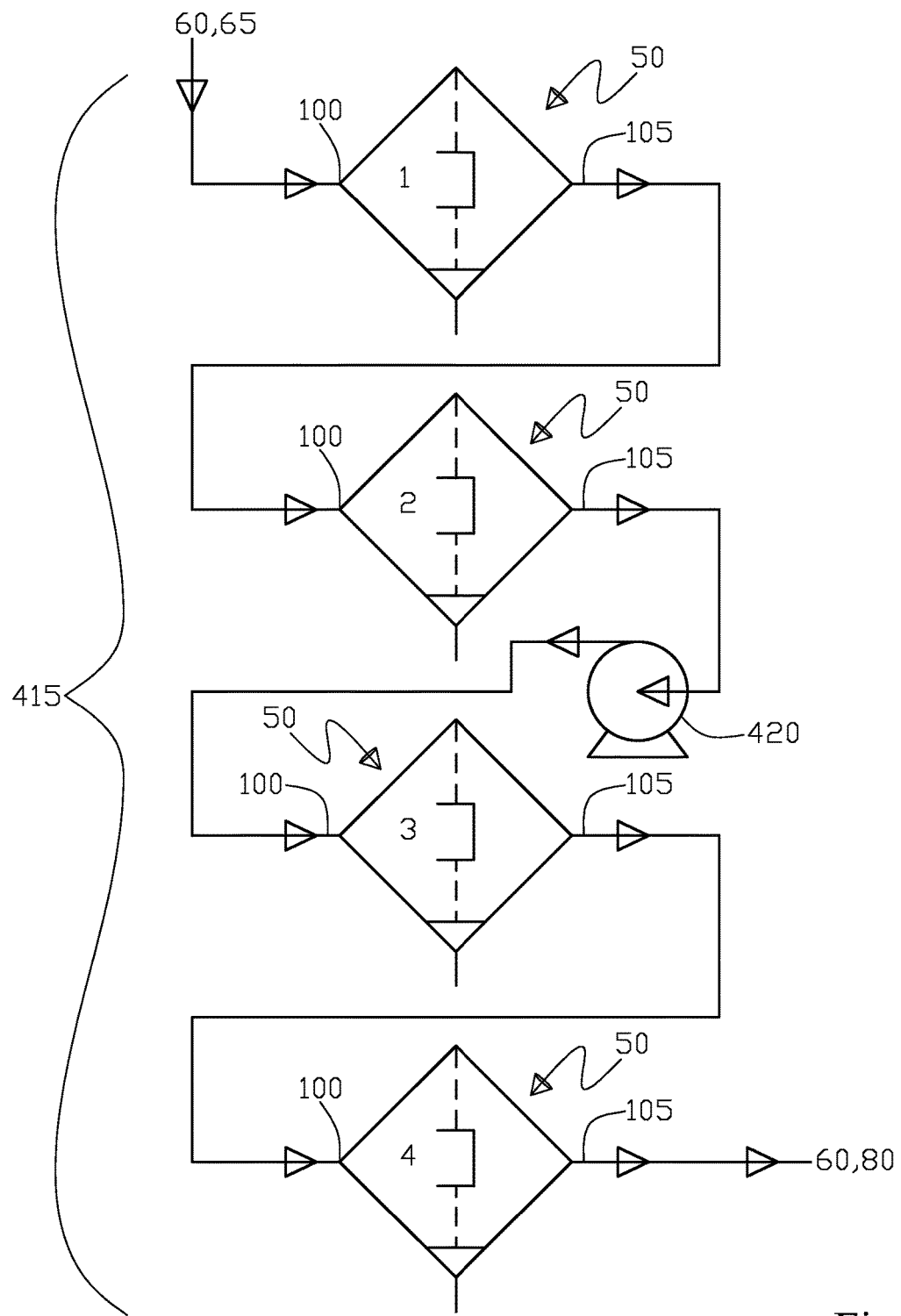
FIG. 11 shows a fluid schematic of a plurality of fluid filter apparatus having strainers and magnets that are arranged is a series configuration where each fluid filter includes the inlet and outlet apertures, plus the overall inlet dirty fluid flow and the outlet substantially purified fluid flow with the addition of a boost pump to increase fluid pressure for ultrafine filtration of the filter media being less than about 10 micron in filtration openings.

Next, FIG. 10 shows a fluid schematic of a plurality of fluid filter apparatus 50 having strainers 155, 160 and magnets 305, 400, wherein the filters 50 are arranged in a series configuration 415 where each fluid filter apparatus 50 includes the inlet 100 and outlet 105 apertures, plus the overall inlet dirty fluid flow 60, 65 and the outlet substantially purified fluid flow 60, 80. Looking toward FIG. 11 shows a fluid schematic of a plurality of fluid filter apparatus 50 having strainers 155, 160 and magnets 305, 400 that are arranged is a series configuration 415 where each fluid filter apparatus 50 includes the inlet 100 and outlet 105 apertures, plus the overall inlet dirty fluid flow 60, 65 and the outlet substantially purified fluid flow 60, 80 with the addition of a boost pump 420 to increase fluid pressure for ultrafine filtration of the filter media 165 being less than about 10 micron in filtration openings.

Figure 12:
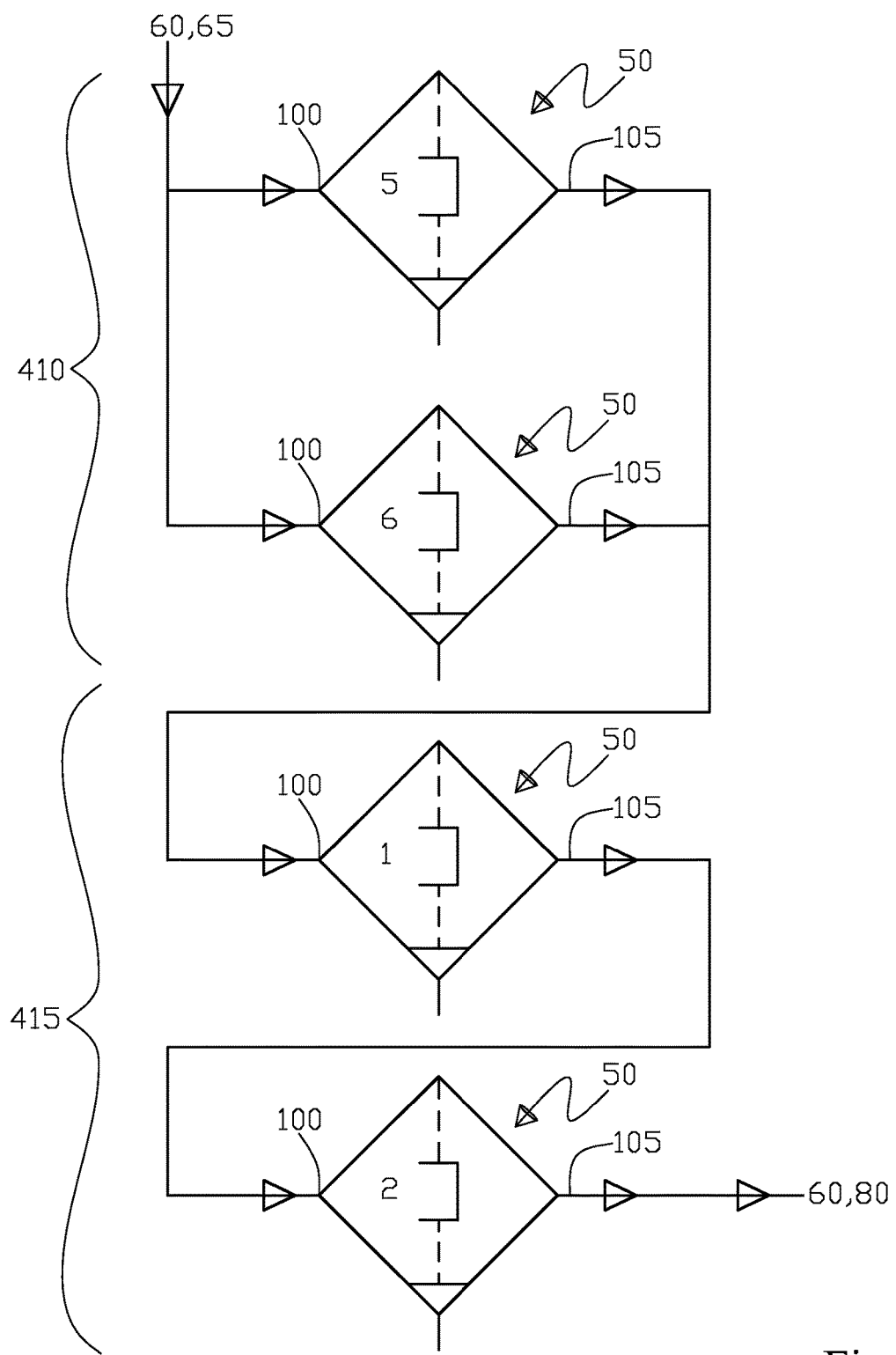
FIG. 12 shows a fluid schematic of a plurality of fluid filter apparatus having strainers and magnets that are arranged is a combination of a series configuration and a parallel configuration where each fluid filter includes the inlet and outlet apertures, plus the overall inlet dirty fluid flow and the outlet substantially purified fluid flow.
Figure 13:
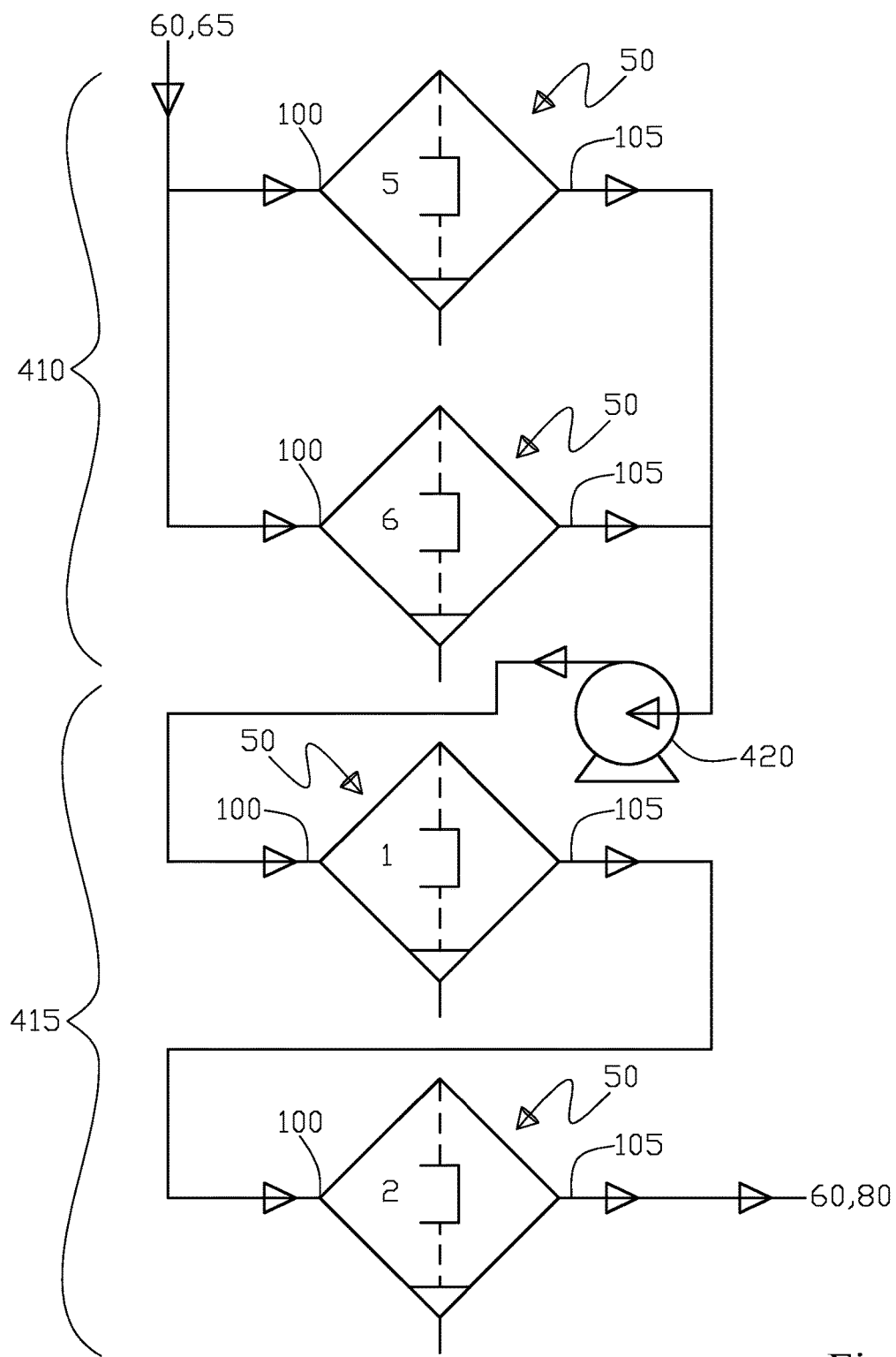
FIG. 13 shows a fluid schematic of a plurality of fluid filter apparatus having strainers and magnets that are arranged is a combination of a series configuration and a parallel configuration where each fluid filter includes the inlet and outlet apertures, plus the overall inlet dirty fluid flow and the outlet substantially purified fluid flow, with the addition of a boost pump to increase fluid pressure for ultrafine filtration of the filter media being less than about 10 micron in filtration openings.

Moving ahead, FIG. 12 shows a fluid schematic of a plurality of fluid filter apparatus 50 having strainers 155, 160 and magnets 305, 400 that are arranged in a combination of a series configuration 415 and a parallel configuration 410 where each fluid filter apparatus 50 includes the inlet 100 and outlet 105 apertures, plus the overall inlet dirty fluid flow 60, 65 and the outlet substantially purified fluid flow 60, 80. Next, FIG. 13 shows a fluid schematic of a plurality of fluid filter apparatus 50 having strainers 155, 160 and magnets 305, 400 that are arranged is a combination of a series 415 configuration and a parallel 410 configuration where each fluid filter apparatus 50 includes the inlet 100 and outlet 105 apertures, plus the overall inlet dirty fluid flow 60, 65 and the outlet substantially purified fluid flow 60, 80, with the addition of a boost pump 420 to increase fluid pressure for ultrafine filtration of the filter media 165 being less than about 10 micron in filtration openings.

Figure 14:
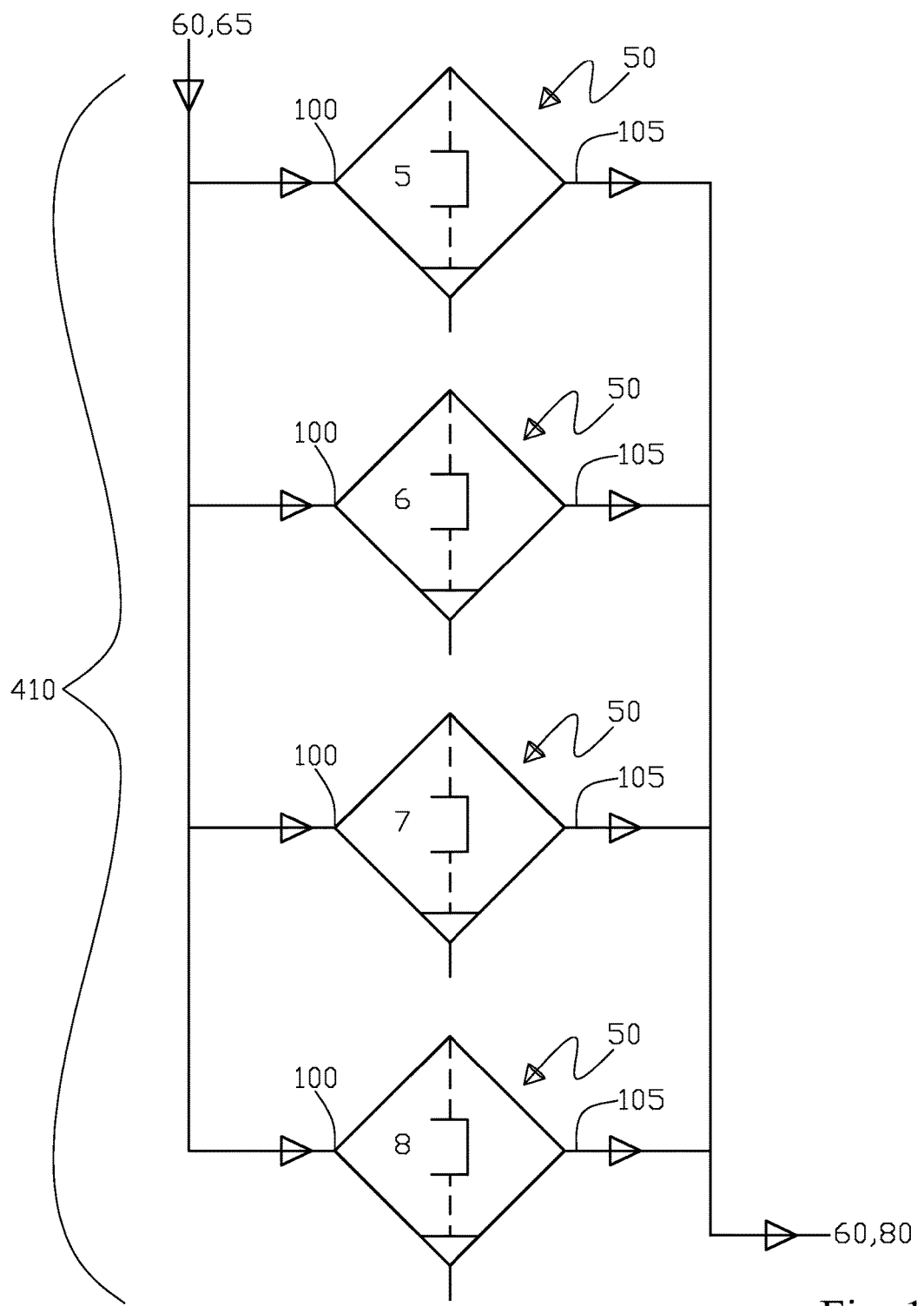
FIG. 14 shows a fluid schematic of a plurality of fluid filter apparatus having strainers and magnets that are arranged is a parallel configuration where each fluid filter includes the inlet and outlet apertures, plus the overall inlet dirty fluid flow and the outlet substantially purified fluid flow.
Figure 15:
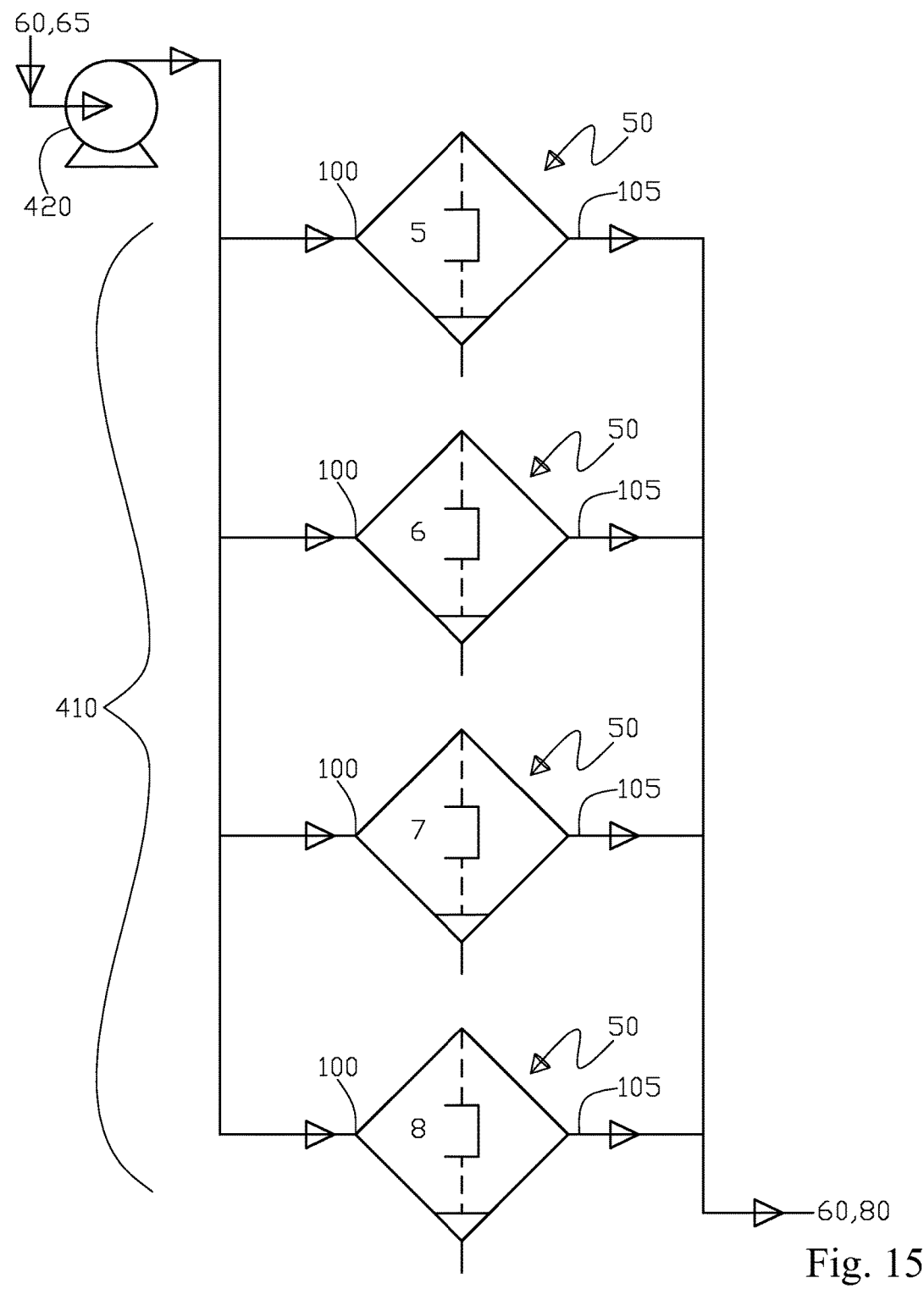
FIG. 15 shows a fluid schematic of a plurality of fluid filter apparatus having strainers and magnets that are arranged is a parallel configuration where each fluid filter includes the inlet and outlet apertures, plus the overall inlet dirty fluid flow and the outlet substantially purified fluid flow, with the addition of a boost pump to increase fluid pressure for ultrafine filtration of the filter media being less than about 10 micron in filtration openings.

Continuing, FIG. 14 shows a fluid schematic of a plurality of fluid filter apparatus 50 having strainers 155, 160 and magnets 305, 400 that are arranged in a parallel configuration 410 where each fluid filter apparatus 50 includes the inlet 100 and outlet 105 apertures, plus the overall inlet dirty fluid flow 60, 65 and the outlet substantially purified fluid flow 60, 80. Moving onward, FIG. 15 shows a fluid schematic of a plurality of fluid filter apparatus 50 having strainers 155, 160 and magnets 305, 400 that are arranged in a parallel configuration 410 where each fluid filter apparatus 50 includes the inlet 100 and outlet 105 apertures, plus the overall inlet dirty fluid flow 60, 65 and the outlet substantially purified fluid flow 60, 80, with the addition of a boost pump 420 to increase fluid pressure for ultrafine filtration of the filter media 165 being less than about 10 micron in filtration openings.

Figure 16:
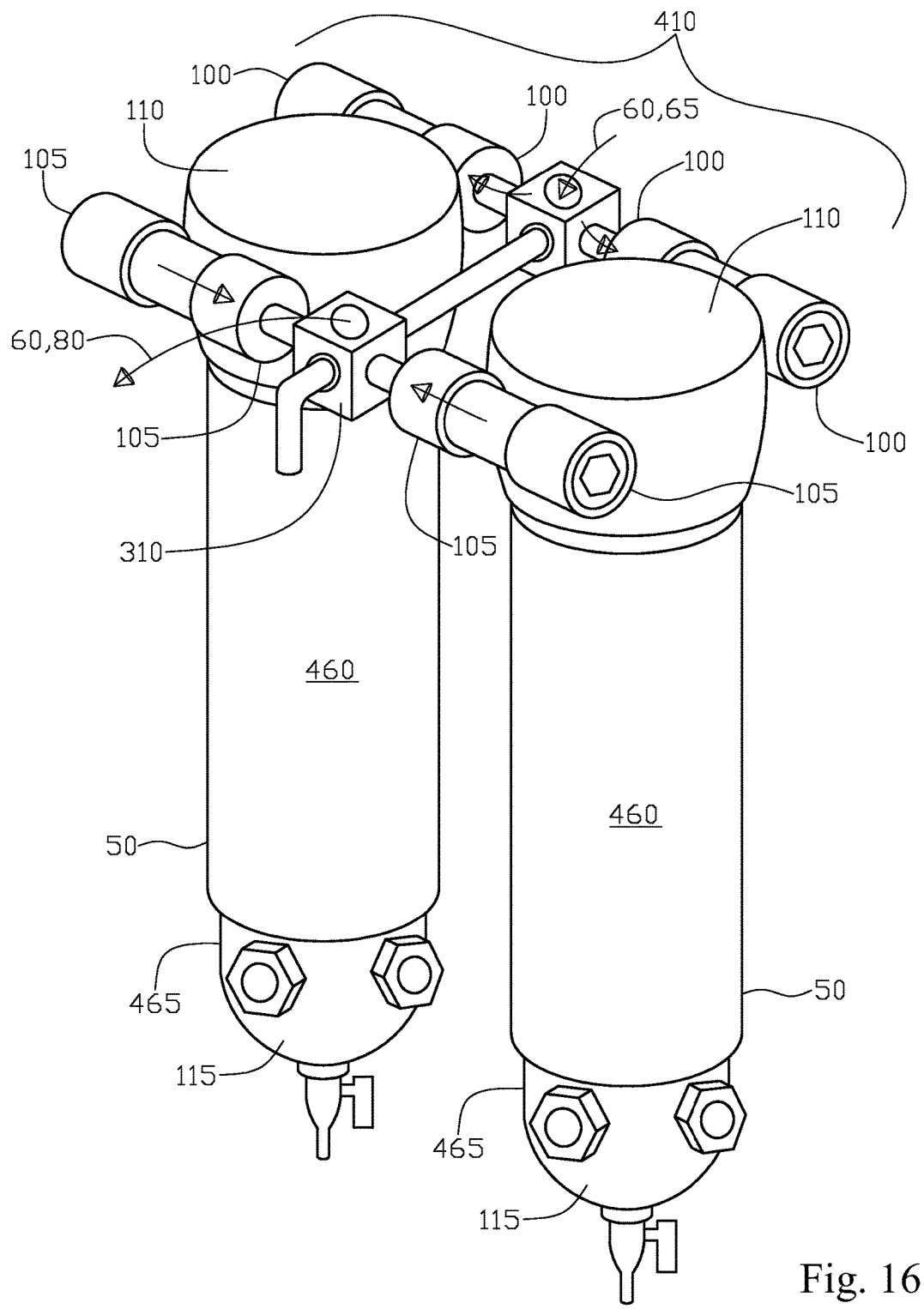
FIG. 16 shows a perspective view of a physical arrangement of pair of fluid filter apparatus as previously shown singularly in FIGS. 1 and 2, wherein the pair of filters are used in conjunction with a transfer valve to allow use of either filter while the other filter is being serviced or to use both filters simultaneously in a parallel arrangement.
Figure 17:
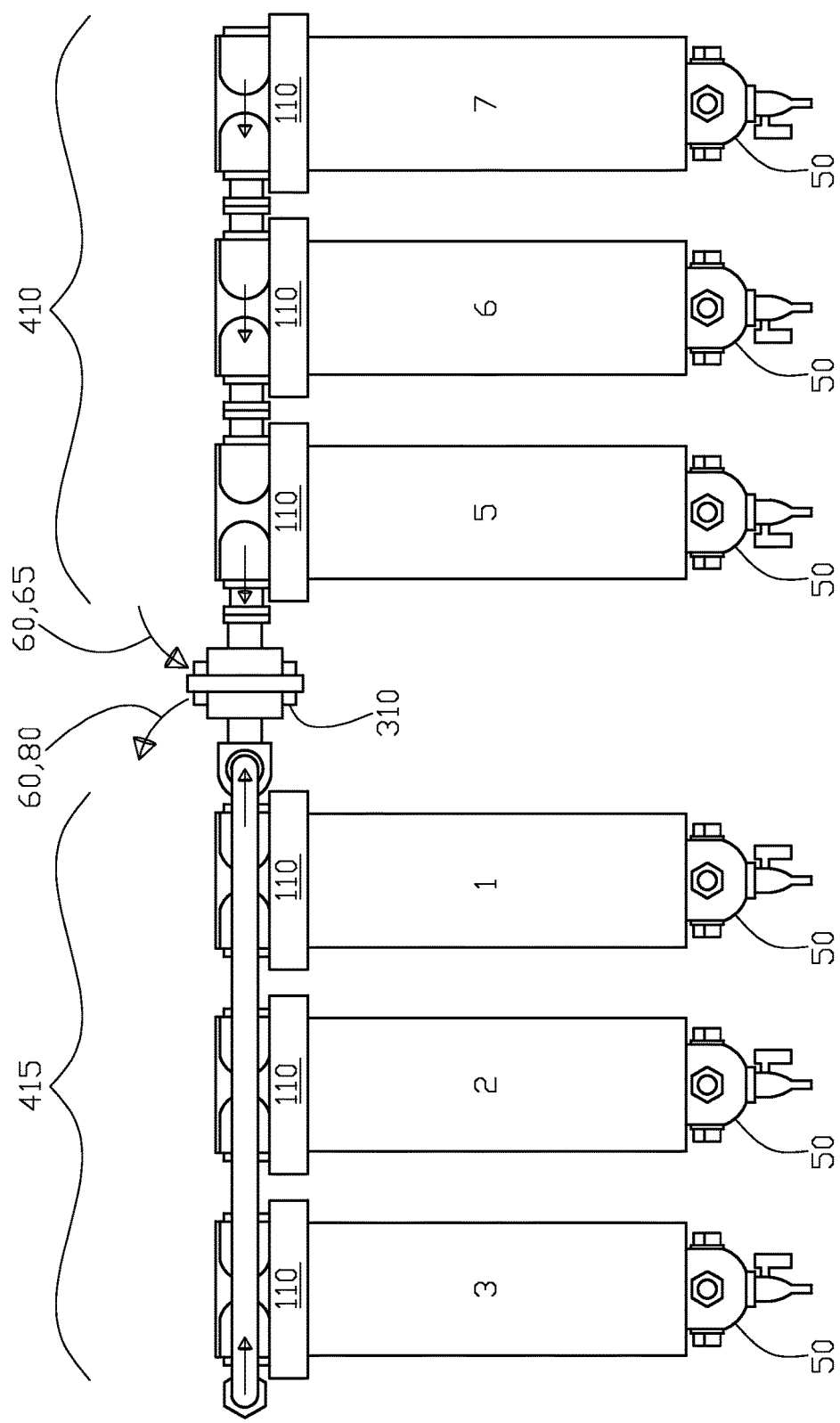
FIG. 17 shows a side elevation view of a physical arrangement of a plurality of fluid filter apparatus as previously shown singularly in FIGS. 1 and 2, wherein the plurality of filters are used in conjunction with a transfer valve to allow use of the plurality of filters in a combination of a series configuration and a parallel configuration as shown schematically in FIG. 12.

Further, FIG. 16 shows a perspective view of a physical arrangement of pair of fluid filter apparatus 50 as previously shown singularly in FIGS. 1 and 2, wherein the pair of filter apparatus 50 are used in conjunction with a transfer valve 310 to allow use of either filter 50 while the other filter 50 is being serviced or to use both filters 50 simultaneously in a parallel arrangement 410. Continuing, FIG. 17 shows a side elevation view of a physical arrangement of a plurality of fluid filter apparatus 50 as previously shown singularly in FIGS. 1 and 2, wherein the plurality of filters 50 are used in conjunction with a transfer valve 310 to allow use of the plurality of filters 50 in a combination of a series configuration 415 and a parallel configuration 410 as shown schematically in FIG. 12.

Figure 18:
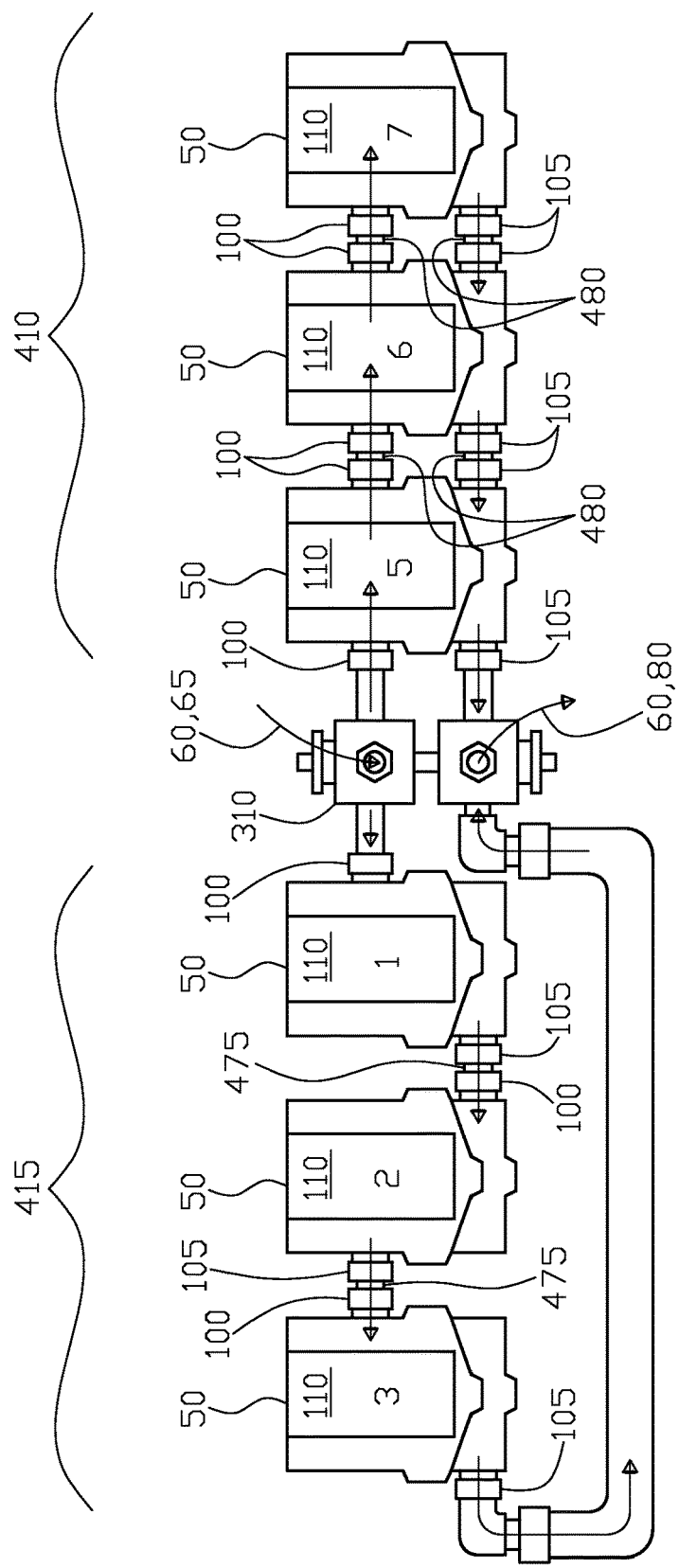
FIG. 18 shows a top plan view of a physical arrangement of a plurality of fluid filter apparatus as previously shown singularly in FIGS. 1 and 2, wherein the plurality of filters are used in conjunction with a transfer valve to allow use of the plurality of filters in a combination of a series configuration and a parallel configuration as shown schematically in FIG. 12 that is facilitated by the inlet and outlet aperture arrangement of the ported head as shown in FIGS. 1 through 8.

Moving ahead, FIG. 18 shows a top plan view of a physical arrangement of a plurality of fluid filter apparatus 50 as previously shown singularly in FIGS. 1 and 2, wherein the plurality of filters 50 are used in conjunction with a transfer valve 310 to allow use of the plurality of filters 50 in a combination of a series configuration 415 and a parallel configuration 410 as shown schematically in FIG. 12 that is facilitated by the inlet 100 and outlet 105 aperture arrangement of the ported head 110 as shown in FIGS. 1 through 8.

In referencing FIGS. 1-9 the fluid filter apparatus 50 for helping to purify 80 a fluid 60 is shown, broadly, the present invention of a fluid filter apparatus 50 includes a first surrounding sidewall 85 with a first end portion 90 and an opposing second end portion 95, also a second surrounding sidewall 120 including a primary end portion 125 and an opposing secondary end portion 130, wherein the second surrounding sidewall 120 is substantially co-axially disposed 135 within the first surrounding sidewall 85, with the secondary end portion 130 adjacent to the first end portion 90, see in particular FIG. 3. Further included on the fluid filter apparatus 50 is a third surrounding sidewall 460 including a third end portion 461 and an opposing fourth end portion 462, wherein the third surrounding sidewall 460 is co-incident to the first surrounding sidewall 85 forming an outer annulus 445 as between the first 85 and third 460 surrounding sidewalls, wherein the third end portion 461 of the third surrounding sidewall 460 is adjacent to the secondary end portion 130 of the second surrounding sidewall 120, again see FIG. 3 in particular.

Further, the fluid filter apparatus 50 includes a fourth surrounding sidewall 465 including a fifth end portion 466 and an opposing sixth end portion 467, the second surrounding sidewall 120 is co-incident with the fourth surrounding sidewall 465 forming a first environmental interior 140 as between the second 120 and fourth 465 surrounding sidewalls, wherein the fifth end portion 466 of the fourth surrounding sidewall 465 is adjacent to the third end portion 461 of the third surrounding sidewall 460, wherein a fluid communication is between the outer annulus 445 and the first environmental interior 140, again as best shown in FIG. 3.

Also, the fluid filter apparatus 50 includes a domed end 115 that is adjacent to the sixth end portion 467 of the fourth surrounding sidewall 465, the domed end 115 forming a fourth environmental interior 151, wherein the fourth environmental interior 151 is in fluid communication with the first environmental interior 140, in addition, a second environmental interior 145 is defined as being disposed within the second surrounding sidewall 120, and a third environmental interior 150 is defined as being disposed within the first surrounding sidewall 85, again see FIG. 3.

Continuing, referencing in particular FIGS. 4 to 8 and also FIGS. 1, 2, 3, and 9, the fluid filter apparatus 50 includes a ported head body 110 that includes a pair of opposing inlet apertures 100, a pair of opposing outlet apertures 105, an inlet chamber 450 in fluid 60 communication with the pair of inlet apertures 100, an outlet chamber 455 in fluid 60 communication with the pair of outlet apertures 105, a standpipe 430 in fluid 60 communication with the outlet chamber 455, and a diversion plate 435 that blocks fluid 60 communication as between the inlet 100 and outlet 105 chambers. Wherein the second end portion 95 of the first surrounding sidewall 85 is adjacent to the ported head body 110 and the fourth end portion 462 of the third surrounding sidewall 460 is adjacent to the ported head body 110 such that a fluid 60 communication exists as between the inlet chamber 450 and the outer annulus 445, and a fluid 60 communication exists as between the outlet chamber 455 and the third environmental interior 150.

Further, for the fluid filter apparatus 50, looking in particular at FIG. 3, included is a filter media 165 disposed within the third environmental interior 150. Wherein operationally, looking at FIGS. 3 and 9 in particular, plus FIGS. 1, 2, 4, 5, 6, 7, and 8, a dirty fluid 60, 65 enters therethrough the inlet aperture 100 to the inlet chamber 450 into the outer annulus 445 and communicates onward to the first environmental interior 140 therethrough to the fourth environmental interior 151 communicating onward to the second environmental interior 145, the fluid 60 further communicating into the third environmental interior 150, and further the fluid 60 communicates therethrough the filter media 165 and onward to the outlet chamber 455 to the outlet aperture 105.

As an alternative for the fluid filter apparatus 50, it further comprise a permanent magnet 400 in a disc shape that is disposed as between the inlet chamber 450 and the outer annulus 445 that is operational to help attract coarse particular contaminates 70 from the dirty fluid 60, 65 communicating from the inlet chamber 450 to the outer annulus 445, see FIGS. 3, 4, 5, and 9. Also as the magnet 400 is positioned on top of the filter media, it is easily removable to clean when the filter media 165 is replaced as best shown in FIGS. 3, 4, and 5.

Another alternative, the fluid filter apparatus 50 can further comprise a permanent magnet in a cylindrical shape 305 that is disposed in the first environmental interior 140 that is operational to help attract finer particular contaminates 71 from the dirty fluid 60, 65 communicating from the outer annulus 445 to the first environmental interior 140, see FIG. 3 in particular for the magnet 305 disposed in the auxiliary port 315 that is adjacent to the first environmental interior 140.

Further alternatively, the fluid filter apparatus 50 can further comprise a permanent magnet in a cylindrical shape 305 that is disposed in the fourth environmental interior 151 that is operational to help attract finer particular contaminates 71 from the dirty fluid 60, 65 communicating from the first environmental interior 140 to the fourth environmental interior 151, as best shown in FIGS. 3 and 9. Preferably the magnet 305 is disposed therethrough the dome 115, wherein the bottom drain valve 470 can optionally have a magnet 305 disposed within the drain valve 470.

Optionally, the fluid filter apparatus 50 can further comprise a permanent magnet in a cylindrical shape 305 that is disposed in one of the pair of inlet apertures 100 of the ported head body 110 to expose the inlet aperture magnet 305 to the inlet chamber 450, the inlet aperture magnet 305 is operational to help attract particular contaminates 70 from the dirty fluid 60, 65 communicating from the opposing inlet aperture 100, see FIGS. 5, 7, and 8 as the best representation of utilizing the unused inlet aperture 100 via magnet 305 for additional particulate 70 removal from the dirty fluid 60, 65. Although the cross section of the magnet 305 is not specifically shown in the inlet aperture 100, it would be the same cross section as magnet 305 disposed therethrough the dome 115 as shown in FIG. 3.

Also, optionally for the fluid filter apparatus 50 can further comprise a permanent magnet in a cylindrical shape 305 that is disposed in one of the pair of outlet apertures 105 of the ported head body 110 to expose the outlet aperture 105 magnet 305 to the outlet chamber 455, wherein the outlet aperture 105 magnet 305 is operational to help attract finer particular contaminates 71 from the fluid communicating 60, 80 from the standpipe 430 to the opposing outlet aperture 105. Again, FIGS. 5, 7, and 8 are the best representation of utilizing the unused outlet aperture 100 via magnet 305 for additional particulate 71 removal from the substantially purified fluid 60, 80. Although the cross section of the magnet 305 is not specifically shown in the outlet aperture 105, it would be the same cross section as magnet 305 disposed therethrough the dome 115 as shown in FIG. 3.

A further option for the fluid filter apparatus 50 that can further comprise a spyder adapter 440 that is disposed on the filter media 165 adjacent to the first end portion 90 of the first surrounding sidewall 85, wherein the spyder adapter 440 is operational to position a plurality of different filter media 165 (size wise) to ensure fluid 60 communication from the filter media 165 to the standpipe 430, as best shown in FIG. 3.

Continuing, on the options for the fluid filter apparatus 50 it can include a primary strainer 155 disposed within the fourth environment interior 151, said primary strainer 155 is positioned the fourth environment interior 151 and the second environment interior 145, wherein the primary strainer 155 is adjacent to the primary end portion 125. The primary strainer 155 allows fluid 60 communication as between the fourth environmental interior 151 and the second environmental interior 145, as best shown in FIG. 3. In addition, optionally a secondary strainer 160 can be included in the fluid filter apparatus 50, wherein the secondary strainer 160 is disposed in the second environmental interior 145 and the secondary strainer 160 is also disposed as between the second environmental interior 145 and the third environmental interior 150, thus allowing fluid 60 communication as between the second environmental interior 145 and the third environmental interior wherein the secondary strainer 160 is adjacent to the secondary end portion 130, again see FIG. 3.

As another option for the fluid filter apparatus 50, it could further include a vane 170 disposed within the first environmental interior 140, wherein operationally the vane 170 imparts a centrifugal velocity 180 to the dirty 65 fluid 60 to substantially separate out the heavy matter that is in the dirty fluid 60, 65 typically in the form of particulates 70 and heavier fluids 75. Further on the optional vane 170, it can form a continuous helical channel 175 within the first environmental interior 140 to direct the dirty 65 fluid 60 from the secondary end portion 130 of the second surrounding sidewall 120 to the primary end portion 125 of the secondary sidewall 120 to be proximate 185 to the primary strainer 155. The continuous helical channel 175 is operational to enhance the centrifugal velocity 180, 205, again see FIG. 3.

Moving to detail on the optional primary strainer 155, for the fluid filter apparatus 50, the primary strainer 155 is preferably formed into a frustroconical shape 190 that structurally forms a continuation 195 of the second surrounding sidewall 120 primary end portion 125, that is operational to substantially maximize the primary strainer 155 exposure to the first environmental interior portion 140 where the dirty 65 fluid 60 is at a lower centrifugal velocity 200 having fewer heavier fluids 75 and fewer particulate contaminates 70. Looking at the optional secondary strainer 160, for the fluid filter element assembly 50, the secondary strainer 160 is preferably formed into a frustroconical shape 210 that is structurally disposed 215 within a majority of the second environmental interior 145, wherein the secondary strainer 160 frustroconical shape 210 is substantially parallel 220 to the second surrounding sidewall 120, that is operational to substantially maximize the secondary strainer 160 exposure to the second environmental interior portion 145 where the fluid 60 is at a lower centrifugal velocity 200 having fewer heavier fluids 75 and fewer particulate contaminates 70.

Continuing, for the fluid filter apparatus 50, optionally the third environmental interior 150 can further include a coalescing chamber 225 disposed as between the secondary strainer 160 and the filter media 165, wherein the coalescing chamber 225 has a fluid flow cross sectional area 230 of at least two times that of a fluid flow cross sectional area 235 of the second environmental interior 145, wherein the coalescing chamber 225 is operational to reduce a velocity 240 of the fluid 60 to allow for further settling out of heavier fluids 75 and particulate contaminates 70 prior to the fluid 60 entering the filter media 165.

Further, optionally on the fluid filter apparatus 50 it can further comprise a boost pump 420 whose outlet is in fluid communication with one of the inlet apertures 100 of the ported head 110, the boost pump 420 is operational to increase fluid 60 flow pressure to accommodate a higher pressure drop of said filter media 165 when the filter media 165 has ultrafine filtration of ten (10) Micron or less, wherein the ultrafine filtration of the filter media 165 would cause excessive pressure drop of the fluid 60 flow therethrough the fluid filter apparatus 50, thus requiring the boost pump 420 to make up for the loss of pressure, see FIGS. 11, 13, and 15 for a schematic representation of the boost pump 420 and fluid filter apparatus 50 arrangement.

Another option for the fluid filter apparatus 50 it can further comprise a plurality of fluid filter apparatus 50 as shown in FIGS. 10, 11, 12, 13, 17, and 18, that are in series fluid communication 415 with one another, wherein for each filter apparatus 50 the ported head body 110 pair of outlet apertures 105 and the pair of inlet apertures 100 are sized and configured such that a first (as indicted by a number of the fluid filter apparatus 50, in the FIGS. 10, 11, 12, 13, 17, and 18) fluid filter apparatus 50 ported head 110 one of a pair outlet apertures 105 is directly connected through a single piece fitting 475 to and in fluid communication with a second fluid filter apparatus 50 ported head 110 one of a pair inlet apertures 100.

Further the second fluid filter apparatus 50 ported head 110 one of a pair outlet apertures 105 is directly connected through the single piece fitting 475 to and in fluid communication with a third fluid filter apparatus 50 ported head 110 one of a pair inlet apertures 100, see in particular FIGS. 17 and 18. Thus operationally resulting in the first, second, and third fluid filter apparatus 50 being in the series fluid communication 415 with one another, wherein the single piece nipple fitting 475 structurally facilitates each of the first, second, and third fluid filter apparatus 50 being positioned juxtapose and in close clearance to one another to save space and make for a compact overall multiple fluid filter 50 series arrangement 415, see in particular FIGS. 17 and 18.

Another option for the fluid filter apparatus 50 can further comprising a plurality of fluid filter apparatus 50 in FIGS. 12, 13, 14, 15, 16, 17, and 18, that are in parallel fluid communication 410 with one another, wherein for each filter apparatus 50 the ported head body 110 pair of outlet apertures 105 and the pair of inlet apertures 100 are sized and configured such that a fifth (as indicted by a number of the fluid filter apparatus 50, in the FIGS. 12, 13, 14, 15, 16, 17, and 18) fluid filter apparatus 50 ported head 110 one of a pair inlet apertures 100 is directly connected through a single coupling fitting 480 to and in fluid communication with a sixth fluid filter apparatus 50 ported head 110 one of a pair of inlet apertures 100. Further the sixth fluid filter apparatus 50 ported head 110 one of a pair of inlet apertures 100 is directly connected through the single coupling fitting 480 to and in fluid communication with a seventh fluid filter apparatus 50 ported head 110 one of a pair inlet apertures 100.

The fifth fluid filter apparatus 50 ported head 110 one of a pair outlet apertures 105 is directly connected through the single coupling fitting 480 to and in fluid communication with a sixth fluid filter apparatus 50 ported head one of a pair of outlet apertures 105, further the sixth fluid filter apparatus 50 ported head 110 one of a pair of outlet apertures 105 is directly connected through the single coupling fitting 480 to and in fluid communication with a seventh fluid filter apparatus 50 ported head 110 one of a pair outlet apertures 105, see in particular FIGS. 17 and 18. Thus operationally resulting in the fifth, sixth, and seventh fluid filter apparatus 50 being in the parallel fluid communication 410 with one another, wherein the single coupling fitting 480 structurally facilitates each of the fifth, sixth, and seventh fluid filter apparatus 50 being positioned juxtapose and in close clearance to one another to save space and make for a compact overall multiple fluid filter 50 parallel arrangement 410, see in particular FIGS. 17 and 18.

For overall operation of the fluid filter apparatus 50 in referring in particular to FIGS. 3 and 9, and otherwise FIGS. 1, 2, 4, 5, 6, 7, and 8, for the fluid filter apparatus 50 in particular for fluid 60 flow; starting at where the dirty 65 fluid enters at aperture 100 with the fluid 60 being preferably an engine fuel where the vane 170 system gives the centrifugal 180 effect, the water 75 and heavier particles 70 will settle to the bottom of the dome 115. Wherein, there is an option to remove the water 75 and particles 70, 71 via draining at 305 with valve 470. Next, the optional primary strainer 155 being disposed in the first environmental interior 140 is preferably a cleanable stainless steel mesh element that will separate smaller water droplets and particles in the frustroconical bowl 190 for easy removal. This stainless mesh for the optional primary strainer 155 is available in 100 or 200 micron absolute cleanable mesh, further the optional primary strainer 155 can coalesce the fluid 60. Continuing, inside the second environmental interior 145 the optional secondary strainer 160 is preferably also a stainless steel mesh strainer to bring the filtration to even finer level. The optional secondary strainer 160 will preferably use a cleanable 40 or 60 micron absolute mesh. Next, in the third environmental interior 150 below the final element filter media 165 the flow area increases in the coalescing chamber 225 via the flow area 230 of the coalescing chamber 225 at two times or greater of the flow area 235 of the second environmental interior 145 that allows the emulsified water 75 and smaller particles 70, 71 to settle out prior the filter media 165.

The filter media 165 is preferably a 10 or a 30 micron absolute media, being 99.9% absolute filtration at a 30 micron rating and a 99.6% absolute filtration at a 10 micron rating, wherein the substantially purified fuel 80 exits at aperture 105. Note, that to accommodate different length or sizes of filter media 165 for different sizes distance 425, see FIG. 3, can be longer or shorter, wherein also the first 85 and third 460 surrounding sidewalls can be different lengths 425 also to match the filter media 165 lengths 425.

Also, for the fluid filter apparatus 50 the current fluid 60, as preferably being an engine fuel has a flow rate range of about one-hundred and eighty (180) to two-thousand sixty (2,060) gallons per hour, with a water removal efficiency of 99% and an ABS or IMO temperature rating of one-thousand seven hundred (1,700) degrees Fahrenheit.

CONCLUSION

Accordingly, the present invention of a fluid filter apparatus 50 has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A fluid filter apparatus for helping to purify a fluid, comprising:
   (a) a first surrounding sidewall including a first end portion and an opposing second end portion,
   (b) a second surrounding sidewall including a primary end portion and an opposing secondary end portion, wherein said second surrounding sidewall is substantially co-axially disposed within said first surrounding sidewall, with said secondary end portion of said second surrounding sidewall being adjacent to said first end portion of said first surrounding sidewall;
   (c) a third surrounding sidewall including a third end portion and an opposing fourth end portion, wherein said third surrounding sidewall is co-incident to said first surrounding sidewall forming an outer annulus as between said first and third surrounding sidewalls, wherein said third end portion of said third surrounding sidewall is adjacent to said secondary end portion of said second surrounding sidewall;
   (d) a fourth surrounding sidewall including a fifth end portion and an opposing sixth end portion, said second surrounding sidewall is co-incident with said fourth surrounding sidewall forming a first environmental interior as between said second and fourth surrounding sidewalls, wherein said fifth end portion of said fourth surrounding sidewall is adjacent to said third end portion of said third surrounding sidewall, wherein a fluid communication is between said outer annulus and said first environmental interior;
   (e) a domed end is adjacent to said sixth end portion of said fourth surrounding sidewall, said domed end forming a fourth environmental interior, wherein said fourth environmental interior is in fluid communication with said first environmental interior;
   (f) a second environmental interior is defined as being disposed within said second surrounding sidewall;
   (g) a third environmental interior is defined as being disposed within said first surrounding sidewall;
   (h) a ported head body that includes a pair of opposing inlet apertures, a pair of opposing outlet apertures, an inlet chamber in fluid communication with said pair of inlet apertures, an outlet chamber in fluid communication with said pair of outlet apertures, a standpipe in fluid communication with said outlet chamber, and a diversion plate that blocks fluid communication as between said inlet and outlet chambers, wherein said second end portion of said first surrounding sidewall is adjacent to said port head body and said fourth end portion of said third surrounding sidewall is adjacent to said port head body such that a fluid communication exists as between said inlet chamber and said outer annulus, and a fluid communication exists as between said outlet chamber and said third environmental interior; and
   (i) a filter media disposed within said third environmental interior, wherein operationally a dirty fluid enters therethrough said inlet aperture to said inlet chamber into said outer annulus and communicates onward to said first environmental interior therethrough to said fourth environmental interior communicating onward to said second environmental interior, the fluid further communicating into said third environmental interior, and further the fluid communicates therethrough said filter media and onward to said outlet chamber to said outlet aperture.

2. A fluid filter apparatus according to claim 1 further comprising a permanent magnet in a disc shape that is disposed as between said inlet chamber and said outer annulus that is operational to help attract coarse particular contaminates from the dirty fluid communicating from said inlet chamber to said outer annulus.

3. A fluid filter apparatus according to claim 2 further comprising a permanent magnet in a cylindrical shape that is disposed in said first environmental interior that is operational to help attract finer particular contaminates from the dirty fluid communicating from said outer annulus to said first environmental interior.

4. A fluid filter apparatus according to claim 2 further comprising a permanent magnet in a cylindrical shape that is disposed in said fourth environmental interior that is operational to help attract finer particular contaminates from the dirty fluid communicating from said first environmental interior to said fourth environmental interior.

5. A fluid filter apparatus according to claim 2 further comprising a permanent magnet in a cylindrical shape that is disposed in one of said pair of inlet apertures of said ported head body to expose said inlet aperture magnet to said inlet chamber, said inlet aperture magnet is operational to help attract particular contaminates from the dirty fluid communicating from said opposing inlet aperture.

6. A fluid filter apparatus according to claim 2 further comprising a permanent magnet in a cylindrical shape that is disposed in one of said pair of outlet apertures of said ported head body to expose said outlet aperture magnet to said outlet chamber, said outlet aperture magnet is operational to help attract finer particular contaminates from the fluid communicating from said standpipe to said opposing outlet aperture.

7. A fluid filter apparatus according to claim 2 further comprising a spyder adapter that is disposed on said filter media adjacent to said first end portion of said first surrounding sidewall, wherein said spyder adapter is operational to position a plurality of different filter media to ensure fluid communication from said filter media to said standpipe.

8. A fluid filter apparatus according to claim 1 further comprising a primary strainer disposed within said fourth environment interior, said primary strainer is positioned between said fourth environmental interior and said second environmental interior thus allowing fluid communication as between said fourth environmental interior and said second environmental interior.

9. A fluid filter apparatus according to claim 8, wherein said primary strainer is formed into a frustroconical shape that structurally forms a continuation of said second surrounding sidewall primary end portion, that is operational to substantially maximize said primary strainer exposure to said fourth environmental interior portion where the dirty fluid is at a lower centrifugal velocity having fewer heavier fluids and fewer particulate contaminates.

10. A fluid filter apparatus according to claim 8 further comprising a secondary strainer disposed within said second environmental interior, said secondary strainer is positioned between said second environmental interior and said third environmental interior thus allowing fluid communication as between said second environmental interior and said third environmental interior.

11. A fluid filter element apparatus according to claim 10, wherein said secondary strainer is formed into a frustroconical shape that is structurally disposed within a majority of said second environmental interior, wherein said secondary strainer frustroconical shape is substantially parallel to said second surrounding sidewall, that is operational to substantially maximize said secondary strainer exposure to said second environmental interior portion where the fluid is at a lower centrifugal velocity having fewer heavier fluids and fewer particulate contaminates.

12. A fluid filter apparatus according to claim 1 further comprising a vane disposed within said first environmental interior, wherein operationally said vane imparts a centrifugal velocity to the dirty fluid to help remove particulates from the dirty fluid.

13. A fluid filter apparatus according to claim 12 wherein said vane forms a continuous helical channel within said first environmental interior to direct the dirty fluid from said secondary end portion of said second surrounding sidewall to said primary end portion of said second surrounding sidewall, wherein operationally said continuous helical channel enhances the centrifugal velocity.

14. A fluid filter apparatus according to claim 10, wherein said third environmental interior further comprises a coalescing chamber disposed between said secondary strainer and said filter media, wherein said coalescing chamber has a fluid flow cross sectional area of at least two times that of a fluid flow cross sectional area of said second environmental interior, said coalescing chamber is operational to reduce a velocity of the fluid to allow for further settling out of heavier fluids and particulate contaminates prior to the fluid entering said filter media.

15. A fluid filter apparatus according to claim 1, further comprising a boost pump whose outlet is in fluid communication with one of said inlet apertures of said ported head, said boost pump is operational to increase fluid flow pressure to accommodate a higher pressure drop of said filter media when said filter media has ultrafine filtration of ten (10) Micron or less.

16. A fluid filter apparatus according to claim 1, further comprising a plurality of fluid filter apparatus that are in parallel fluid communication with one another, wherein for each filter apparatus said ported head body pair of outlet apertures and said pair of inlet apertures are sized and configured such that a fifth fluid filter apparatus ported head one of a pair inlet apertures is directly connected through a single coupling fitting to and in fluid communication with a sixth fluid filter apparatus ported head one of a pair of inlet apertures, further said sixth fluid filter apparatus ported head one of a pair of inlet apertures is directly connected through a single coupling fitting to and in fluid communication with a seventh fluid filter apparatus ported head one of a pair inlet apertures, said fifth fluid filter apparatus ported head one of a pair outlet apertures is directly connected through a single coupling fitting to and in fluid communication with a sixth fluid filter apparatus ported head one of a pair of outlet apertures, further said sixth fluid filter apparatus ported head one of a pair of outlet apertures is directly connected through a single coupling fitting to and in fluid communication with a seventh fluid filter apparatus ported head one of a pair outlet apertures, thus operationally resulting in said fifth, sixth, and seventh fluid filter apparatus being in said parallel fluid communication with one another, wherein said single coupling fitting structurally facilitates each of said fifth, sixth, and seventh fluid filter apparatus being positioned juxtapose and in close clearance to one another.

* * * * *